United States Patent
Wadkar et al.

(10) Patent No.: US 12,142,940 B2
(45) Date of Patent: Nov. 12, 2024

(54) CROSS TALK AND INTERFERENCE MITIGATION IN DUAL WIRELESS POWER TRANSMITTER

(71) Applicant: NuCurrent, Inc., Chicago, IL (US)

(72) Inventors: Unnati Wadkar, Bangalore (IN); Marc Backas, Chicago, IL (US); Pavel Shostak, San Diego, CA (US); Glenn Riese, McHenry, IL (US)

(73) Assignee: NuCurrent, Inc., Chicago, IL (US)

( * ) Notice: Subject to any disclaimer, the term of this patent is extended or adjusted under 35 U.S.C. 154(b) by 0 days.

(21) Appl. No.: 18/519,813

(22) Filed: Nov. 27, 2023

(65) Prior Publication Data
US 2024/0235272 A1 Jul. 11, 2024

Related U.S. Application Data

(63) Continuation of application No. 17/683,982, filed on Mar. 1, 2022, now Pat. No. 11,831,174.

(51) Int. Cl.
*H02J 50/40* (2016.01)
*H02J 50/10* (2016.01)
(Continued)

(52) U.S. Cl.
CPC .............. *H02J 50/40* (2016.02); *H02J 50/10* (2016.02); *H02J 50/80* (2016.02); *H04L 27/04* (2013.01); *H04B 5/79* (2024.01)

(58) Field of Classification Search
CPC . H02J 50/40; H02J 50/80; H02J 50/10; H04L 27/04; H04B 5/79
(Continued)

(56) References Cited

U.S. PATENT DOCUMENTS

| 2,797,393 A | 6/1957 | Clogston |
| 2,911,605 A | 11/1959 | Wales, Jr. et al. |

(Continued)

FOREIGN PATENT DOCUMENTS

| CN | 2650300 Y | 10/2004 |
| CN | 103944196 A | 7/2014 |

(Continued)

OTHER PUBLICATIONS

IPR2019-00858—*Samsung Electronics Co., Ltd.* v. *NuCurrent, Inc.*, Petition for Inter Partes Review of U.S. Pat. No. 8,680,960, Mar. 22, 2019, 90 pages.
(Continued)

*Primary Examiner* — Alfonso Perez Borroto
(74) *Attorney, Agent, or Firm* — Lee Sullivan Shea & Smith LLP

(57) ABSTRACT

A dual wireless power transfer system includes an input power supply and a first wireless power transmission system receiving power at a first power input from the input power supply. The first wireless power transmission system includes a first transmitter antenna and a first driver for driving the first transmitter antenna for wireless power transmission and wireless receipt of data, wherein data wirelessly received at the first transmitter antenna at least partially feeds back onto the first power input. A second wireless power transmission system includes a second transmitter antenna and a second driver for driving the second transmitter antenna for wireless power transmission. A low voltage drop out receives power from the input power supply and provides power at a preselected lower voltage to the second wireless power transmission system, such that $V_2$ is independent of data received at the first transmitter antenna.

20 Claims, 14 Drawing Sheets

(51) Int. Cl.
*H02J 50/80* (2016.01)
*H04L 27/04* (2006.01)
*H04B 5/79* (2024.01)

(58) Field of Classification Search
USPC .......................................................... 307/104
See application file for complete search history.

(56) References Cited

U.S. PATENT DOCUMENTS

| | | | |
|---|---|---|---|
| 3,484,731 | A | 12/1969 | Rich et al. |
| 4,328,531 | A | 5/1982 | Nagashima et al. |
| 4,494,100 | A | 1/1985 | Stengel et al. |
| 4,959,631 | A | 9/1990 | Hasegawa et al. |
| 4,996,165 | A | 2/1991 | Chang et al. |
| 5,137,478 | A | 8/1992 | Graf et al. |
| 5,237,165 | A | 8/1993 | Tingley, III |
| 5,604,352 | A | 2/1997 | Schuetz |
| 5,713,939 | A | 2/1998 | Nedungadi et al. |
| 5,748,464 | A | 5/1998 | Schuetz |
| 5,767,808 | A | 6/1998 | Robbins et al. |
| 5,767,813 | A | 6/1998 | Verma et al. |
| 5,777,538 | A | 7/1998 | Schuetz |
| 5,801,611 | A | 9/1998 | Van Loenen et al. |
| 5,808,587 | A | 9/1998 | Shima |
| 5,838,154 | A | 11/1998 | Morikawa et al. |
| 5,883,392 | A | 3/1999 | Schuetz |
| 5,892,489 | A | 4/1999 | Kanba et al. |
| 5,980,773 | A | 11/1999 | Takeda |
| 6,005,193 | A | 12/1999 | Markel |
| 6,021,337 | A | 2/2000 | Remillard et al. |
| 6,028,568 | A | 2/2000 | Asakura et al. |
| 6,107,972 | A | 8/2000 | Seward et al. |
| 6,148,221 | A | 11/2000 | Ishikawa et al. |
| 6,163,307 | A | 12/2000 | Kim et al. |
| 6,271,803 | B1 | 8/2001 | Watanabe et al. |
| 6,503,831 | B2 | 1/2003 | Speakman |
| 6,556,101 | B1 | 4/2003 | Tada et al. |
| 6,583,769 | B2 | 6/2003 | Shiroki et al. |
| 6,664,863 | B1 | 12/2003 | Okamoto et al. |
| 6,809,688 | B2 | 10/2004 | Yamada |
| 6,897,830 | B2 | 5/2005 | Bae et al. |
| 6,924,230 | B2 | 8/2005 | Sun et al. |
| 7,046,113 | B1 | 5/2006 | Okamoto et al. |
| 7,205,655 | B2 | 4/2007 | Sippola |
| 7,355,558 | B2 | 4/2008 | Lee |
| 7,563,352 | B2 | 7/2009 | Hubel |
| 7,579,835 | B2 | 8/2009 | Schnell et al. |
| 7,579,836 | B2 | 8/2009 | Schnell et al. |
| 7,713,762 | B2 | 5/2010 | Lee et al. |
| 7,786,836 | B2 | 8/2010 | Gabara |
| 7,952,365 | B2 | 5/2011 | Narita et al. |
| 7,962,186 | B2 | 6/2011 | Cui et al. |
| 8,056,819 | B2 | 11/2011 | Rowell et al. |
| 8,299,877 | B2 | 10/2012 | Hong et al. |
| 8,436,780 | B2 | 5/2013 | Schantz et al. |
| 8,567,048 | B2 | 10/2013 | Singh et al. |
| 8,610,530 | B2 | 12/2013 | Singh et al. |
| 8,653,927 | B2 | 2/2014 | Singh et al. |
| 8,680,960 | B2 | 3/2014 | Singh et al. |
| 8,692,641 | B2 | 4/2014 | Singh et al. |
| 8,692,642 | B2 | 4/2014 | Singh et al. |
| 8,698,590 | B2 | 4/2014 | Singh et al. |
| 8,698,591 | B2 | 4/2014 | Singh et al. |
| 8,707,546 | B2 | 4/2014 | Singh et al. |
| 8,710,948 | B2 | 4/2014 | Singh et al. |
| 8,774,712 | B2 | 7/2014 | Sato et al. |
| 8,803,649 | B2 | 8/2014 | Singh et al. |
| 8,823,481 | B2 | 9/2014 | Singh et al. |
| 8,823,482 | B2 | 9/2014 | Singh et al. |
| 8,855,786 | B2 | 10/2014 | Derbas et al. |
| 8,860,545 | B2 | 10/2014 | Singh et al. |
| 8,898,885 | B2 | 12/2014 | Singh et al. |
| 9,178,369 | B2 | 11/2015 | Partovi |
| 9,208,942 | B2 | 12/2015 | Singh et al. |
| 9,559,526 | B2 | 1/2017 | Von Novak, III et al. |
| 9,912,173 | B2 | 3/2018 | Tseng |
| 10,868,444 | B2 | 12/2020 | Peralta et al. |
| 10,892,646 | B2 | 1/2021 | Peralta et al. |
| 10,985,465 | B2 | 4/2021 | Singh et al. |
| 11,271,428 | B2 | 3/2022 | Nakano et al. |
| 2002/0020554 | A1 | 2/2002 | Sakamoto et al. |
| 2002/0053992 | A1 | 5/2002 | Kawakami et al. |
| 2002/0071003 | A1 | 6/2002 | Kimura |
| 2002/0075191 | A1 | 6/2002 | Yokoshima et al. |
| 2002/0101383 | A1 | 8/2002 | Junod |
| 2002/0105080 | A1 | 8/2002 | Speakman |
| 2003/0006069 | A1 | 1/2003 | Takebe et al. |
| 2003/0058180 | A1 | 3/2003 | Forster et al. |
| 2003/0119677 | A1 | 6/2003 | Qiyan et al. |
| 2004/0000974 | A1 | 1/2004 | Odenaal et al. |
| 2004/0085247 | A1 | 5/2004 | Mickle et al. |
| 2004/0108311 | A1 | 6/2004 | De Rooij et al. |
| 2004/0118920 | A1 | 6/2004 | He |
| 2004/0140528 | A1 | 7/2004 | Kim et al. |
| 2004/0159460 | A1 | 8/2004 | Passiopoulos et al. |
| 2004/0189528 | A1 | 9/2004 | Killen et al. |
| 2004/0217488 | A1 | 11/2004 | Luechinger |
| 2004/0227608 | A1 | 11/2004 | Nakatani et al. |
| 2005/0121229 | A1 | 6/2005 | Takai et al. |
| 2005/0174628 | A1 | 8/2005 | Kelly et al. |
| 2006/0022772 | A1 | 2/2006 | Kanno et al. |
| 2006/0040628 | A1 | 2/2006 | Porret et al. |
| 2006/0192645 | A1 | 8/2006 | Lee et al. |
| 2006/0284718 | A1 | 12/2006 | Baumgartner et al. |
| 2007/0018767 | A1 | 1/2007 | Gabara |
| 2007/0020969 | A1 | 1/2007 | Yungers |
| 2007/0023424 | A1 | 2/2007 | Weber |
| 2007/0045773 | A1 | 3/2007 | Mi et al. |
| 2007/0046544 | A1 | 3/2007 | Murofushi et al. |
| 2007/0095913 | A1 | 5/2007 | Takahashi et al. |
| 2007/0120629 | A1 | 5/2007 | Schnell et al. |
| 2007/0179570 | A1 | 8/2007 | De Taboada et al. |
| 2007/0182367 | A1 | 8/2007 | Partovi |
| 2007/0267718 | A1 | 11/2007 | Lee |
| 2007/0279287 | A1 | 12/2007 | Castaneda et al. |
| 2008/0039332 | A1 | 2/2008 | Bernstein et al. |
| 2008/0055178 | A1 | 3/2008 | Kim et al. |
| 2008/0062066 | A1 | 3/2008 | Arai |
| 2008/0067874 | A1 | 3/2008 | Tseng |
| 2008/0150693 | A1 | 6/2008 | You et al. |
| 2008/0164840 | A1 | 7/2008 | Kato et al. |
| 2008/0164844 | A1 | 7/2008 | Kato et al. |
| 2008/0164960 | A1 | 7/2008 | Schnell et al. |
| 2008/0211320 | A1 | 9/2008 | Cook et al. |
| 2008/0277386 | A1 | 11/2008 | Haimer |
| 2008/0283277 | A1 | 11/2008 | Muramatsu et al. |
| 2008/0303735 | A1 | 12/2008 | Fujimoto et al. |
| 2009/0015266 | A1 | 1/2009 | Narita et al. |
| 2009/0039828 | A1 | 2/2009 | Jakubowski |
| 2009/0079628 | A1 | 3/2009 | Rofougaran |
| 2009/0085706 | A1 | 4/2009 | Baarman et al. |
| 2009/0096413 | A1 | 4/2009 | Partovi et al. |
| 2009/0108974 | A1 | 4/2009 | Raggam et al. |
| 2009/0134875 | A1 | 5/2009 | Tomiha et al. |
| 2009/0140691 | A1 | 6/2009 | Jung |
| 2009/0152542 | A1 | 6/2009 | Lee et al. |
| 2009/0230777 | A1 | 9/2009 | Baarman et al. |
| 2009/0243397 | A1 | 10/2009 | Cook et al. |
| 2009/0261778 | A1 | 10/2009 | Kook |
| 2009/0261936 | A1 | 10/2009 | Widjaja et al. |
| 2010/0033290 | A1 | 2/2010 | Liu et al. |
| 2010/0072588 | A1 | 3/2010 | Yang |
| 2010/0127660 | A1 | 5/2010 | Cook et al. |
| 2010/0141042 | A1 | 6/2010 | Kesler et al. |
| 2010/0164296 | A1 | 7/2010 | Kurs et al. |
| 2010/0219694 | A1 | 9/2010 | Kurs et al. |
| 2010/0289599 | A1 | 11/2010 | Knecht et al. |
| 2010/0289709 | A1 | 11/2010 | Guan |
| 2010/0295701 | A1 | 11/2010 | Denis et al. |
| 2011/0009057 | A1 | 1/2011 | Saunamaki |
| 2011/0024510 | A1 | 2/2011 | Kato et al. |
| 2011/0084656 | A1 | 4/2011 | Gao |
| 2011/0101788 | A1 | 5/2011 | Sun et al. |
| 2011/0137379 | A1 | 6/2011 | Wosmek et al. |

(56) References Cited

U.S. PATENT DOCUMENTS

| | | |
|---|---|---|
| 2011/0241437 A1 | 10/2011 | Kanno |
| 2011/0248891 A1 | 10/2011 | Han et al. |
| 2011/0279198 A1 | 11/2011 | Haner |
| 2012/0062345 A1 | 3/2012 | Kurs et al. |
| 2012/0095531 A1 | 4/2012 | Derbas et al. |
| 2012/0098485 A1 | 4/2012 | Kang et al. |
| 2012/0126544 A1 | 5/2012 | Simpson et al. |
| 2012/0161696 A1 | 6/2012 | Cook et al. |
| 2012/0169434 A1 | 7/2012 | Masuda et al. |
| 2012/0217819 A1 | 8/2012 | Yamakawa et al. |
| 2012/0235500 A1 | 9/2012 | Ganem et al. |
| 2012/0235634 A1 | 9/2012 | Hall et al. |
| 2012/0235636 A1 | 9/2012 | Partovi |
| 2012/0249396 A1 | 10/2012 | Parsche |
| 2012/0274148 A1 | 11/2012 | Sung et al. |
| 2012/0280765 A1 | 11/2012 | Kurs et al. |
| 2012/0326931 A1 | 12/2012 | Murayama et al. |
| 2013/0026981 A1* | 1/2013 | Van Der Lee ........... H04B 5/79 |
| | | 320/108 |
| 2013/0067737 A1 | 3/2013 | Singh et al. |
| 2013/0067738 A1 | 3/2013 | Singh et al. |
| 2013/0068499 A1 | 3/2013 | Singh et al. |
| 2013/0068507 A1 | 3/2013 | Singh et al. |
| 2013/0069748 A1 | 3/2013 | Singh et al. |
| 2013/0069749 A1 | 3/2013 | Singh et al. |
| 2013/0069750 A1 | 3/2013 | Singh et al. |
| 2013/0069843 A1 | 3/2013 | Singh et al. |
| 2013/0076154 A1 | 3/2013 | Baarman et al. |
| 2013/0088088 A1 | 4/2013 | Wambsganss et al. |
| 2013/0146671 A1 | 6/2013 | Grieshofer et al. |
| 2013/0199027 A1 | 8/2013 | Singh et al. |
| 2013/0199028 A1 | 8/2013 | Singh et al. |
| 2013/0200070 A1 | 8/2013 | Singh et al. |
| 2013/0200722 A1 | 8/2013 | Singh et al. |
| 2013/0200968 A1 | 8/2013 | Singh et al. |
| 2013/0200969 A1 | 8/2013 | Singh et al. |
| 2013/0200976 A1 | 8/2013 | Singh et al. |
| 2013/0201589 A1 | 8/2013 | Singh et al. |
| 2013/0205582 A1 | 8/2013 | Singh et al. |
| 2013/0207468 A1 | 8/2013 | Wu et al. |
| 2013/0207744 A1 | 8/2013 | Singh et al. |
| 2013/0208389 A1 | 8/2013 | Singh et al. |
| 2013/0208390 A1 | 8/2013 | Singh et al. |
| 2013/0257362 A1 | 10/2013 | Lim et al. |
| 2013/0260676 A1 | 10/2013 | Singh |
| 2013/0300207 A1 | 11/2013 | Wang |
| 2014/0008974 A1 | 1/2014 | Miyamoto |
| 2014/0028111 A1 | 1/2014 | Hansen et al. |
| 2014/0035383 A1 | 2/2014 | Riehl |
| 2014/0035793 A1 | 2/2014 | Kato et al. |
| 2014/0041218 A1 | 2/2014 | Signh et al. |
| 2014/0047713 A1 | 2/2014 | Singh et al. |
| 2014/0084857 A1 | 3/2014 | Liu et al. |
| 2014/0084946 A1 | 3/2014 | Clark et al. |
| 2014/0159646 A1* | 6/2014 | Sankar ................... H02J 50/05 |
| | | 307/149 |
| 2014/0168019 A1 | 6/2014 | Hirobe et al. |
| 2014/0183971 A1 | 7/2014 | Endo et al. |
| 2014/0197694 A1 | 7/2014 | Asanuma et al. |
| 2014/0231518 A1 | 8/2014 | Yosui |
| 2014/0266019 A1 | 9/2014 | Pigott |
| 2014/0320090 A1 | 10/2014 | Keeling et al. |
| 2014/0347008 A1 | 11/2014 | Chae et al. |
| 2014/0361628 A1 | 12/2014 | Huang et al. |
| 2015/0054455 A1 | 2/2015 | Kim et al. |
| 2015/0091502 A1 | 4/2015 | Mukherjee et al. |
| 2015/0102774 A1 | 4/2015 | DiGuardo |
| 2015/0115727 A1 | 4/2015 | Carobolante et al. |
| 2015/0136858 A1 | 5/2015 | Finn et al. |
| 2015/0137746 A1 | 5/2015 | Lee et al. |
| 2015/0140807 A1 | 5/2015 | Mohammed et al. |
| 2015/0145634 A1 | 5/2015 | Kurz et al. |
| 2015/0145635 A1 | 5/2015 | Kurz et al. |
| 2015/0180440 A1 | 6/2015 | Ishizuka |
| 2015/0207541 A1 | 7/2015 | Kuroda |
| 2015/0236545 A1 | 8/2015 | Hyun et al. |
| 2015/0256226 A1 | 9/2015 | Lin et al. |
| 2015/0270058 A1 | 9/2015 | Golko et al. |
| 2015/0280322 A1 | 10/2015 | Saito et al. |
| 2015/0318710 A1 | 11/2015 | Lee et al. |
| 2015/0326143 A1 | 11/2015 | Petras et al. |
| 2015/0357827 A1 | 12/2015 | Muratov et al. |
| 2016/0029266 A1 | 1/2016 | Choi-Grogan et al. |
| 2016/0056664 A1 | 2/2016 | Partovi |
| 2016/0087447 A1 | 3/2016 | Laudebat et al. |
| 2016/0094051 A1 | 3/2016 | Soar |
| 2016/0104566 A1 | 4/2016 | O'Brien et al. |
| 2016/0118711 A1 | 4/2016 | Finn et al. |
| 2016/0126002 A1 | 5/2016 | Chien et al. |
| 2016/0149416 A1 | 5/2016 | Ha et al. |
| 2016/0156103 A1 | 6/2016 | Bae et al. |
| 2016/0156215 A1 | 6/2016 | Bae et al. |
| 2016/0190851 A1 | 6/2016 | Pudipeddi et al. |
| 2016/0224975 A1 | 8/2016 | Na et al. |
| 2016/0292669 A1 | 10/2016 | Tunnell et al. |
| 2016/0301238 A1 | 10/2016 | Khoshvenis |
| 2017/0018936 A1 | 1/2017 | Muratov et al. |
| 2017/0040691 A1 | 2/2017 | Singh et al. |
| 2017/0040826 A1 | 2/2017 | Arendarik |
| 2017/0098957 A1* | 4/2017 | Sankar ..................... H04B 5/79 |
| 2017/0126544 A1 | 5/2017 | Vigneras et al. |
| 2017/0229925 A1 | 8/2017 | Shirani-Mehr et al. |
| 2017/0279292 A1* | 9/2017 | Shirani-Mehr ......... H02J 50/10 |
| 2017/0279306 A1 | 9/2017 | Elad et al. |
| 2018/0109142 A1 | 4/2018 | Jung et al. |
| 2018/0167107 A1 | 6/2018 | Peralta et al. |
| 2018/0167108 A1 | 6/2018 | Peralta et al. |
| 2018/0167109 A1 | 6/2018 | Peralta et al. |
| 2018/0168057 A1 | 6/2018 | Peralta et al. |
| 2018/0212649 A1 | 7/2018 | Tenno |
| 2018/0342905 A1 | 11/2018 | Fukaya et al. |
| 2018/0351370 A1 | 12/2018 | Ichikawa |
| 2019/0157914 A1 | 5/2019 | Watanabe |
| 2019/0173316 A1 | 6/2019 | Shin et al. |
| 2019/0190320 A1 | 6/2019 | Park |
| 2019/0296590 A1 | 9/2019 | Chae |
| 2020/0119594 A1 | 4/2020 | Wang et al. |
| 2020/0287419 A1 | 9/2020 | Sherman et al. |
| 2020/0343769 A1 | 10/2020 | Nakano et al. |
| 2020/0373789 A1 | 11/2020 | Park et al. |
| 2021/0249888 A1 | 8/2021 | Van Uden et al. |
| 2022/0006330 A1 | 1/2022 | Abukhalaf et al. |

FOREIGN PATENT DOCUMENTS

| | | |
|---|---|---|
| CN | 104037493 A | 9/2014 |
| CN | 104037494 A | 9/2014 |
| EP | 0310396 A1 | 4/1989 |
| EP | 1609503 A1 | 12/2005 |
| EP | 2031729 A2 | 3/2009 |
| EP | 2775565 A1 | 9/2014 |
| JP | H01310518 A | 12/1989 |
| JP | H0583249 A | 4/1993 |
| JP | H0993005 A | 4/1997 |
| JP | H10255629 A | 9/1998 |
| JP | 2001344574 A | 12/2001 |
| JP | 2007042569 A | 2/2007 |
| JP | 2008160781 A | 7/2008 |
| JP | 2008205215 A | 9/2008 |
| JP | 2008294285 A | 12/2008 |
| JP | 2008307114 A | 12/2008 |
| JP | 2012147408 A | 8/2012 |
| JP | 2013070580 A | 4/2013 |
| JP | 2013093429 A | 5/2013 |
| JP | 2014175864 A | 9/2014 |
| JP | 2014175865 A | 9/2014 |
| KR | 20100092741 A | 8/2010 |
| KR | 20130015618 A | 2/2013 |
| KR | 20140111554 A | 9/2014 |
| KR | 20140111794 A | 9/2014 |
| KR | 20140135357 A | 11/2014 |
| KR | 101559939 B1 | 10/2015 |
| KR | 20190062710 A | 6/2019 |
| TW | 201436494 A | 9/2014 |

(56) References Cited

FOREIGN PATENT DOCUMENTS

| TW | 201436495 A | 9/2014 |
|---|---|---|
| WO | 2008050917 A1 | 5/2008 |
| WO | 2010104569 A1 | 9/2010 |
| WO | 2019050157 A1 | 3/2019 |
| WO | 2020171663 A1 | 8/2020 |

OTHER PUBLICATIONS

IPR2019-00858—*Samsung Electronics Co., Ltd.* v. *NuCurrent, Inc.*, Ex. 1001, U.S. Pat. No. 8,680,960 to Singh et al., Mar. 22, 2019, 50 pages.
IPR2019-00859—*Samsung Electronics Co., Ltd.* v. *NuCurrent, Inc.*, Petition for Inter Partes Review of U.S. Pat. No. 9,300,046, Mar. 22, 2019, 87 pages.
IPR2019-00859—*Samsung Electronics Co., Ltd.* vs. *NuCurrent, Inc.*, Ex. 1017—U.S. Pat. No. 5,812,344 to Balakrishnan, Mar. 22, 2019, 12 pages.
IPR2019-00859—*Samsung Electronics Co., Ltd.* vs. *NuCurrent, Inc.*, Ex. 1025—U.S. Pat. No. 20070126544A1 to Wotherspoon, Mar. 22, 2019, 6 pages.
IPR2019-00860—Ex. 1022 U.S. Pat. No. 9,912,173 to Tseng, Mar. 6, 2018, 31 pages.
IPR2019-00860—Ex. 1023 U.S. Pat. No. 7,248,138 to Chiang, Jul. 24, 2007, 18 pages.
IPR2019-00860—Ex. 1024 U.S. Pat. No. 5,084,958 to Yerman et al., Feb. 4, 1992, 20 pages.
IPR2019-00860—Ex. 1028—U.S. Pat. No. 9,820,374 to Bois et al., Nov. 14, 2017, 9 pages.
IPR2019-00860—Ex. 1029 U.S. Pat. No. 7,601,919 to Phan et al., Oct. 13, 2009, 14 pages.
IPR2019-00860—Ex. 1030 U.S. Pat. No. 5,108,825 to Wojnarowski et al., Apr. 28, 1992, 10 pages.
IPR2019-00860—Ex. 1034—U.S. Pat. No. 6,608,363 to Fazelpour, Aug. 19, 2003, 8 pages.
IPR2019-00860—*Samsung Electronics Co., Ltd.* v. *NuCurrent, Inc.*, Petition for Inter Partes Review of U.S. Pat. No. 8,680,960, Mar. 22, 2019, 86 pages.
IPR2019-00861—*Samsung Electronics Co., Ltd.* v. *NuCurrent, Inc.*, Petition for Inter Partes Review of U.S. Pat. No. 9,300,046, Mar. 22, 2019, 89 pages.
IPR2019-00862—*Samsung Electronics Co., Ltd.* v. *NuCurrent, Inc.*, Petition for Inter Partes Review of U.S. Pat. No. 8,710,948, Mar. 22, 2019, 88 pages.
IPR2019-0863, *Samsung Electronics Co., Ltd.* v. *NuCurrent, Inc.*, Petition for Inter Partes Review of U.S. Pat. No. 8,698,591, Mar. 22, 2019, 89 pages.
Lee, Y., "Antenna Circuit Design for RFID Applications", 2003 Microchip Technology, AN710, 50 pages.
Muratov, V., "Multi-Mode Wireless Power Systems can be a bridge to the Promised Land of Universal Contactless charging", Mediatek, Inc., Nov. 20, 2014, 15 pages.
Narayanan, R., "Wireless Power Charging Coil Changing Considerations", Wurth Elektronik, Feb. 23, 2015, 9 pages.
Notification of Decision of Rejection dated May 14, 2019 for KR 10-2013-0026135, 8 pages.
Notification of Decision of Rejection dated May 14, 2019 for KR App. No. 10-2013-0025858, with English Translation, 8 pages.
Office Action dated Apr. 27, 2018 in corresponding TW Application No. 102108345, 11 pages.
Office Action dated Aug. 23, 2017 in corresponding CN Application No. 201310074946.8, 10 pages.
Office Action dated Aug. 25, 2017 in corresponding CN Application No. 201310075086.X, 10 pages.
Office Action dated Dec. 12, 2017 issued in corresponding Japanese Patent Application No. 2013-047048, 11 pages.
Office Action dated Feb. 21, 2017, issued in corresponding Taiwanese Patent Application No. 102108342, 10 pages.

Office Action dated Jan. 31, 2017 in corresponding JP Application No. 2013-047049, 5 pages.
Office Action dated Jun. 29, 2017 issued in corresponding EP Patent Application No. 14000885.5, 4 pages.
Office Action dated Mar. 21, 2017 issued in corresponding Japanese Patent Application No. 2013-047048, 12 pages.
Office Action dated Mar. 27, 2018 issued in corresponding Chinese Patent Application No. 201310075086.X, 12 pages.
Office Action dated Mar. 30, 2018 issued in corresponding Chinese Patent Application No. 201310074946.8, 12 pages.
Office Action dated May 8, 2018, issued in corresponding Japanese Patent Application No. 2013-047048, 2 pages.
Office Action dated Nov. 28, 2017 in corresponding JP Application No. 2013-047049, 5 pages.
Office Action dated Oct. 29, 2018 in corresponding KR Application No. 10-2013-0025858, 12 pages.
Office Action dated Oct. 29, 2018 in corresponding KR Application No. 10-2013-0026135, 12 pages.
Office Action dated Sep. 12, 2018 in corresponding CN Application No. 201310074946.8, 9 pages.
Office Action dated Sep. 12, 2018 in corresponding CN Application No. 201310075086.X, 10 pages.
Office Action dated Sep. 27, 2016 in corresponding EP Application No. 13 001 121.6, 6 pages.
Office Action dated Sep. 27, 2016 in corresponding EP Application No. 13 001 130.7 6, pages.
PCT/US2020/042765 International Search Report and Written Opinion, dated Nov. 3, 2020, 13 pages.
PCTUS2021012112 International Search Report and Written Opinion dated Apr. 27, 2021, 18 pages.
QI 2009, "System Description Wireless Power Transfer", vol. 1, Low Power, Version 0.95, Jul. 2009, 76 pages.
QI 2010, "System Description Wireless Power Transfer", vol. 1, Low Power, Part 1: Interface Definition, Version 1.0.1, Oct. 2010, Wireless Power Consortium, 86 pages.
Relative Permativity—Dielectric Constant—Jul. 2011, 3 pages.
Samsung Ex. 1002, —*Samsung Electronics Co., Ltd.* v. *NuCurrent, Inc.*, U.S. Pat. No. 8,680,960, Declaration of Dr. Steven Leeb, Mar. 22, 2019, 115 pages.
Sun M., et al., "Apparatus for Wireless Power and Data Transfer over a Distance", University of Pittsburgh, Jun. 2009, 30 pages.
Yoon, Y., "Embedded Conductor Technology for Micromachined RF Elements", Journal of Micromechanics and Micro engineering, Jun. 2005, 11 pages.
Barcelo T., "Wireless Power User Guide", Linear Technology, Application Note 138, Oct. 2013, 8 pages.
Burghartz, J., "On the Design of RF Spiral Inductors on Silicon", IEEE Transactions on Electron Devices, vol. 50, No. 3, Mar. 2003, pp. 718-729.
Decision of Dismissal of Amendment issued in corresponding Japanese Patent Application No. 2013-047048, dated May 8, 2018, 7 pages.
EP Communication pursuant to Rule 62 EPC regarding extended European Search Report dated May 15, 2019, for EP App. No. 16835665.7-1212, 16 pages.
EP Office Communication Pursuant to Article 94(3) dated Jan. 17, 2019 for EP App. No. 13001121.6-1216, 4 pages.
European Patent Office, Extended European Search Report mailed on Aug. 1, 2013, issued in connection with EP Application No. 13001121.6, 6 pages.
European Patent Office, Extended European Search Report mailed on Aug. 1, 2013, issued in connection with EP Application No. 13001130.7, 6 pages.
European Patent Office, Extended European Search Report mailed on Nov. 4, 2014, issued in connection with EP Application No. 14000885.5, 8 pages.
European Patent Office, Extended European Search Report mailed on Aug. 7, 2014, issued in connection with EP Application No. 10751119.8, 12 pages.
European Patent Office, Extended European Search Report mailed on Jun. 12, 2019, issued in connection with EP Application No. 19154162.2, 9 pages.

(56) References Cited

OTHER PUBLICATIONS

European Patent Office, Partial Supplementary European Search Report mailed on Feb. 14, 2019, issued in connection with EP Application No. 16835665.7, 10 pages.
Ex. 1001 U.S. Pat. No. 8,698,591, Singh, Apr. 15, 2014, 49 pages.
Ex. 1001 U.S. Pat. No. 8,710,948 to Singh et al., Apr. 29, 2014, 49 pages.
Ex. 1001 U.S. Pat. No. 9,300,046 to Singh et al., Mar. 29, 2016, 50 pages.
Ex. 1003—CV of Dr. Steven B. Leeb, Mar. 22, 2019, 7 pages.
Ex. 1004 File History of U.S. Pat. No. 8,710,948 to Singh et al., Apr. 29, 2014, 213 pages.
Ex 1004—File History for U.S. Pat. No. 8,680,960, Singh, Mar. 25, 2014, 201 pages. (in two attachments due to size).
Ex. 1004—Prosecution History of U.S. Pat. No. 8,698,591, Singh, Apr. 15, 2014, 180 pages.
Ex. 1004—Prosecution History of U.S. Pat. No. 9,300,046, Singh, Mar. 29, 2016, 322 pages (in two attachments A and B) due to size.
Ex. 1005—US20070267718A1 to Lee, Nov. 22, 2007, 13 pages.
Ex 1006—Semat—Physics Chapters 29-32, 81 pages, (1958).
Ex 1009—US20090096413 to Partovi, Apr. 16, 2009, 88 pages.
Ex. 1010—IEEE Standard Dictionary of Electrical and Electronics Terms, Sixth Edition (1996), 9 pages.
Ex. 1011—US20070089773A1 to Koester et al., Apr. 26, 2007, 26 pages.
Ex. 1012—US20120280765 to Kurs, Nov. 8, 2012, 122 pages.
Ex. 1012—U.S. Pat. No. 6,432,497 to Bunyan, Aug. 13, 2002, 12 pages.
Ex. 1014 U.S. Pat. No. 6,083,842 to Cheung et al., Jun. 4, 2000, 8 pages.
Ex. 1015 Reinhold, et al., "Efficient Antenna Design of Inductive Coupled RFID-Systems with High Power Demand," Journal of Communication, Nov. 2007, vol. 2, No. 6, pp. 14-23.
Ex. 1016 U.S. Pat. No. 4,549,042 to Akiba et al., Oct. 22, 1985, 8 pages.
Ex. 1018—Wheeler, "Formulas for the Skin Effect," Proceeding of the I.R.E, Sep. 1942, pp. 412-424.
Ex. 1019—Kyriazidou—U.S. Pat. No. 7,236,080, Jun. 26, 2007, 12 pages.
Ex. 1020 Alldred, et al., "A 1.2 V, 60 Ghz Radio Receiver With Onchip Transformers and Inductors in 90 nm CMOS," Proc. IEEE Compound Semiconductor Integrated Circuits SYmp., pp. 51-54, Nov. 2006 ("Alldred"), 12 pages.
Ex. 1031 Ahn 7030725, Apr. 18, 2006, 9 pages.
Ex. 1032—U.S. Pat. No. 5,745,331 to Shamouilian et al., Apr. 28, 1998, 23 pages.
Ex. 1033—Hu, et al., "AC Resistance to Planar Power Inductors and the Quasidistributed Gap Technique," IEEE Transactions on Power Electronics, vol. 16, No. 4, Jul. 2001 ("Hu"), 13 pages.
Ex. 1035—A 1.2V 60-GHz Radio Receiver With On-Chip Transformers and Inductors in 90-nm CMOS, 2006 IEEE Compound Semiconductor Integrated Circuit Symposium, Nov. 12-15, 2006, 2 pages.
Ex. 1036 Kraemer, et al., "Architecture Considerations for 60 GhzPulse Transceiver Front-Ends," CAS 2007 Proceedings vol. 2, 2007, Int'l Semiconductor Conference (2007), 26 pages.
Ex. 1037—Varonen, et al., "V-band Balanced Resistive Mixer in 65-nm CMOS," Proceedings of the 33rd European Solid-State Circuits Conference, 2007, 22 pages.
Ex. 1038—AC Resistance of Planar Power Inductors and the Quasidistributed Gap Technique, IEEE Transactions on Power Electronics, vol. 16, Issue 4, Jul. 2001, 2 pages.
Ex. 1039—Lopera et al., "A Multiwinding Modeling Method for High Frequency Transformers and Inductors", IEEE Transactions on Power Electronics, vol. 18, No. 3, May 2003, 14 pages.
Ex. 1040—Leonavicius et al., "Comparison of Realization Techniques for PFC Inductor Operating in Discontinuous Conduction Mode," IEEE Transactions on Power Electronics, vol. 19, No. 2, Mar. 2004, 14 pages.
Ex. 1041—Roshen W.A., "Fringing Field Formulas and Winding Loss Due to an Air Gap," IEEE Transactions on Magnetics, vol. 43, No. 8, Aug. 2007, 12 pages.
Extended Search Report dated Sep. 10, 2019 for EP 19188841.1-1216, 11 pages.
First Office Action dated Aug. 5, 2019 for Chinese App. No. 201680058731.9, English Translation, 6 pages.
International Searching Authority, PCT International Search Report and Written Opinion, PCT International Application No. PCT/US2021/064960 dated Apr. 25, 2022, 11 pages.
International Searching Authority, PCT International Search Report and Written Opinion, PCT International Application No. PCT/US2023/063498 dated Jun. 26, 2023, 18 pages.
International Searhing Authority, International Search Report and Written Opinion mailed on Nov. 8, 2017, issued in connection with International Application No. PCT/US2017/048708, filed on Aug. 25, 2017, 10 pages.
International Searhing Authority, International Search Report and Written Opinion mailed on Oct. 14, 2016, issued in connection with International Application No. PCT/US2016/045588, filed on Aug. 4, 2016, 9 pages.
International Searhing Authority, International Search Report and Written Opinion mailed on Feb. 21, 2018, issued in connection with International Application No. PCT/US2017/065329, filed on Dec. 8, 2017, 7 pages.
International Searhing Authority, International Search Report and Written Opinion mailed on Oct. 28, 2016, issued in connection with International Application No. PCT/US2016/047607, filed on Aug. 18, 2016, 7 pages.

* cited by examiner

CROSS TALK AND INTERFERENCE MITIGATION IN DUAL WIRELESS POWER TRANSMITTER

CROSS-REFERENCE TO RELATED APPLICATIONS

This application is a continuation of, and claims priority to, U.S. application Ser. No. 17/683,982, filed on Mar. 1, 2022 and entitled "CROSS TALK AND INTERFERENCE MITIGATION IN DUAL WIRELESS POWER TRANSMITTER," which is incorporated by reference in its entirety.

TECHNICAL FIELD

The present disclosure generally relates to systems and methods for wireless transfer of electrical power and/or electrical data signals, and, more particularly, to wireless power transmission to multiple independent receivers.

BACKGROUND

Wireless connection systems are used in a variety of applications for the wireless transfer of electrical energy, electrical power, electromagnetic energy, electrical data signals, among other known wirelessly transmittable signals. Such systems often use inductive and/or resonant inductive wireless power transfer, which occurs when magnetic fields created by a transmitting element induce an electric field and, hence, an electric current, in a receiving element. These transmitting and receiving elements will often take the form of coiled wires and/or antennas.

Transmission of one or more of electrical energy, electrical power, electromagnetic energy and/or electronic data signals from one of such coiled antennas to another, generally, operates at an operating frequency and/or an operating frequency range. The operating frequency may be selected for a variety of reasons, such as, but not limited to, power transfer characteristics, power level characteristics, self-resonant frequency restraints, design requirements, adherence to standards bodies' required characteristics (e.g. electromagnetic interference (EMI) requirements, specific absorption rate (SAR) requirements, among other things), bill of materials (BOM), and/or form factor constraints, among other things. It is to be noted that, "self-resonating frequency," as known to those having skill in the art, generally refers to the resonant frequency of a passive component (e.g., an inductor) due to the parasitic characteristics of the component.

When such systems operate to wirelessly transfer power from a transmission system to a receiver system, via the coils and/or antennas, it is often desired to simultaneously or intermittently communicate electronic data from one system to the other. To that end, a variety of communications systems, methods, and/or apparatus have been utilized for combined wireless power and wireless data transfer. In some example systems, wireless power transfer related communications (e.g., validation procedures, electronic characteristics data communications, voltage data, current data, device type data, among other contemplated data communications) are performed using other circuitry, such as an optional Near Field Communications (NFC) antenna utilized to compliment the wireless power system and/or additional Bluetooth chipsets for data communications, among other known communications circuits and/or antennas.

However, using additional antennas and/or circuitry can give rise to several disadvantages. For instance, using additional antennas and/or circuitry can be inefficient and/or can increase the BOM of a wireless power system, which raises the cost for putting wireless power into an electronic device. Further, in some such systems, out of band communications provided by such additional antennas may result in interference, such as cross-talk between the antennas; such cross talk may present challenges in. Further yet, inclusion of such additional antennas and/or circuitry can result in worsened EMI, as introduction of the additional system will cause greater harmonic distortion, in comparison to a system wherein both a wireless power signal and a data signal are within the same channel. Still further, inclusion of additional antennas and/or circuitry hardware, for communications or increased charging or powering area, may increase the area within a device, for which the wireless power systems and/or components thereof reside, complicating a build of an end product.

SUMMARY

In some example applications for wireless power transfer, it is desired to power and/or charge multiple electronic devices simultaneously. Currently, systems and/or products exist, employing multiple transmitter coils and associated driver circuits, wherein each system couples with an individual receiving device. However, such systems that currently exist may be prone to interference between one receiver and both transmitters, leading to potential inefficiencies and/or complications in communications capability or causing degradation to communications capabilities.

To that end, wireless power transmitter sets capable of independently powering multiple wireless receivers are desired, wherein removal of one receiver system does not cause crosstalk between the remaining receiver and the ostensibly idle transmitter system.

In accordance with one aspect of the disclosure, a dual wireless power transfer system is disclosed having an input power supply providing power at a first voltage V1 and a first wireless power transmission system receiving power at a first power input from the input power supply, the first wireless power transmission system including a first transmitter antenna and a first driver for driving the first transmitter antenna for wireless power transmission to a first wireless receiver system and wireless receipt of data from the first receiver system, wherein data wirelessly received at the first transmitter antenna from the first receiver system at least partially feeds back onto the first power input. A second wireless power transmission system includes a second transmitter antenna and a second driver for driving the second transmitter antenna for wireless power transmission to a second wireless receiver system. A low voltage drop out receives power from the input power supply at $V_1$ and provides power at a preselected lower voltage $V_2$ to the second wireless power transmission system, such that $V_2$ is independent of data received at the first transmitter antenna.

In a refinement, the first and second drivers each comprise an H-Bridge, and further, the data wirelessly received at the first transmitter antenna that at least partially feeds back onto the first power input may be fed back by a power input of the H-Bridge.

The voltage $V_1$ varies over a range having a lowest value, and in an aspect, the preselected voltage $V_2$ may be set to remain below $V_1$.

In a refinement, one or both of the first and second receiver systems includes a powered load, and in further refinement, the load is an electrical energy storage device. The first and second wireless power transmission systems further include respective transmission controllers in a refinement, configured to provide respective antenna signals to the respective antenna drivers.

The first and second power transmission systems also include respective demodulation circuits in a refinement, wherein the demodulation circuits are configured to process and demodulate communications signals received from the respective receiver system.

In a refinement, the communications signals are coded via amplitude shift keying (ASK), and in yet a further refinement, the first and second transmission antennas are configured to operate based on an operating frequency of about 88-360 KHz.

In another aspect of the disclosure, a dual wireless power transfer system is provided having an input power supply providing power at a first voltage $V_1$ as well as a first wireless receiver system and a second wireless receiver system, each wireless receiver system being configured to wirelessly receive power from a respective wireless power transmission system via a wireless power protocol and to wirelessly transmit data to the respective wireless power transmission system via the wireless power protocol. In this aspect, a first wireless power transmission system is provided for receiving power at a first power input from the input power supply, the first wireless power transmission system including a first transmitter antenna and a first driver for driving the first transmitter antenna for wireless power transmission to the first wireless receiver system and wireless receipt of data from the first receiver system, wherein data wirelessly received at the first transmitter antenna from the first receiver system at least partially feeds back onto the first power input.

Further, a second wireless power transmission system includes a second transmitter antenna and a second driver for driving the second transmitter antenna for wireless power transmission to the second wireless receiver system, and a low voltage drop out receiving power from the input power supply at $V_1$ and providing power at a preselected lower voltage $V_2$ to the second wireless power transmission system at a second power input, such that $V_2$ is independent of data received at the first transmitter antenna that is at least partially fed back onto the first power input.

In a refinement, the first and second drivers each comprise an H-Bridge and the data wirelessly received at the first transmitter antenna is partially fed back by a power input of the H-Bridge associated with the first transmitter antenna. In a further refinement, $V_1$ varies over a range having a lowest value, and wherein the preselected voltage $V_2$ is set to remain below the lowest value of the range of $V_1$.

In another refinement, one or both of the first and second receiver systems includes a powered load, and in a further refinement, the load is an electrical energy storage device.

In a refinement of this aspect, the first and second wireless power transmission systems include respective transmission controllers configured to provide respective antenna signals to the respective antenna drivers. Further, each of the first and second power transmission systems may have a respective demodulation circuit configured to process and demodulate communications signals received from the respective receiver system. The communications signals may be coded via amplitude shift keying (ASK). In another refinement, each of the first transmission antenna and the second transmission antenna are configured to operate based on an operating frequency of about 6.78 MHz.

In another aspect, a dual wireless power transmission system includes a power input configured to receive electrical power at a first voltage $V_1$, a first wireless power transmission system receiving power from the power input, the first wireless power transmission system including a first transmitter antenna and a first driver for driving the first transmitter antenna for wireless power transmission to the first wireless receiver system and wireless receipt of data from a first receiver system, wherein data wirelessly received at the first transmitter antenna from the first receiver system at least partially feeds back onto the power input, and a second wireless power transmission system including a second transmitter antenna and a second driver for driving the second transmitter antenna for wireless power transmission to a second wireless receiver system.

In this aspect, a voltage reduction element is provided, receiving power from the power input and providing power at a voltage lower than that of the power input to the second wireless power transmission system, wherein the power output by the voltage reduction element is independent of voltage variations on the power input.

These and other aspects and features of the present disclosure will be better understood when read in conjunction with the accompanying drawings.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto. Additional, different, or fewer components and methods may be included in the systems and methods.

DETAILED DESCRIPTION

In the following description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Figure 1:
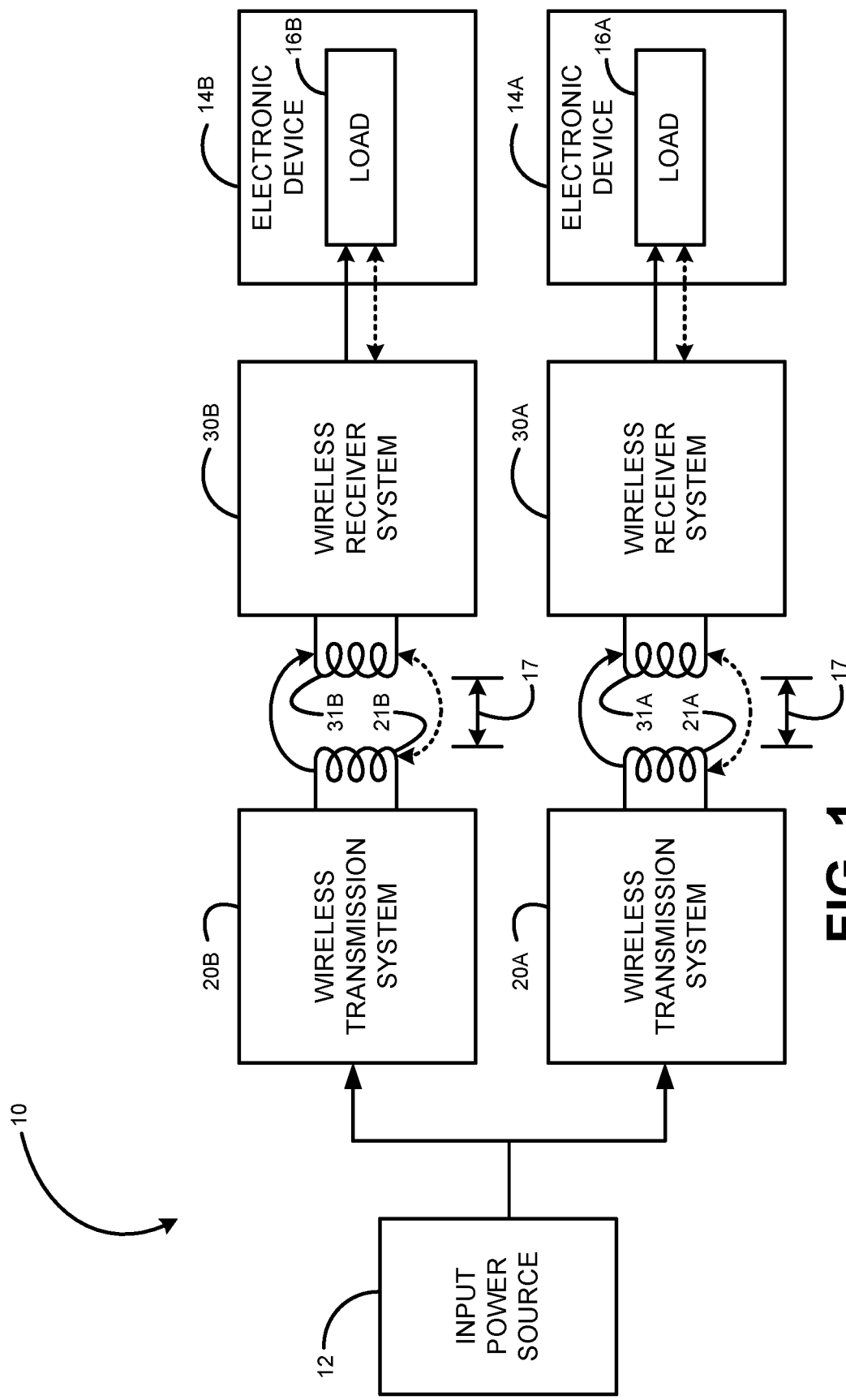
FIG. 1 is a block diagram of an embodiment of a system for wirelessly transferring one or more of electrical energy, electrical power signals, electrical power, electromagnetic energy, electronic data, and combinations thereof, in accordance with the present disclosure.

Referring now to the drawings and with specific reference to FIG. 1, a wireless power transfer system 10 is illustrated. The wireless power transfer system 10 provides for the wireless transmission of electrical signals, such as, but not limited to, electrical energy, electrical power, electrical power signals, electromagnetic energy, and electronically transmittable data ("electronic data"). As used herein, the term "electrical power signal" refers to an electrical signal transmitted specifically to provide meaningful electrical energy for charging and/or directly powering a load, whereas the term "electronic data signal" refers to an electrical signal that is utilized to convey data across a medium.

The wireless power transfer system 10 provides for the wireless transmission of electrical signals via near field magnetic coupling. As shown in the embodiment of FIG. 1, the wireless power transfer system 10 includes multiple wireless transmission systems 20(A,B) and multiple wireless receiver systems 30(A,B). Each wireless receiver system 30 is configured to receive electrical signals from its associated wireless transmission system 20. As illustrated, the system 10 contains two wireless transmission systems 20, and two associated wireless receiver systems 30. However, it should be appreciated that the described structure of transmitter/receiver pairs, where all transmitters are powered by a single input power source, can be extended to any number of transmitter/receiver pairs.

As illustrated, the wireless transmission systems 20 and wireless receiver systems 30 are configured to transmit electrical signals across, at least, a separation distance or gap 17. A separation distance or gap, such as the gap 17, in the context of a wireless power transfer system, such as the system 10, does not include a physical connection, such as a wired connection. There may be intermediary objects located in a separation distance or gap, such as, but not limited to, air, a counter top, a casing for an electronic device, a plastic filament, an insulator, a mechanical wall, among other things; however, there is no physical, electrical connection at such a separation distance or gap.

Thus, the combination of a wireless transmission system 20 and wireless receiver system 30 creates an electrical connection without the need for a physical connection. As used herein, the term "electrical connection" refers to any facilitation of a transfer of an electrical current, voltage, and/or power from a first location, device, component, and/or source to a second location, device, component, and/or destination. An "electrical connection" may be a physical connection, such as, but not limited to, a wire, a trace, a via, among other physical electrical connections, connecting a first location, device, component, and/or source to a second location, device, component, and/or destination. Additionally or alternatively, an "electrical connection" may be a wireless power and/or data transfer, such as, but not limited to, magnetic, electromagnetic, resonant, and/or inductive field, among other wireless power and/or data transfers, connecting a first location, device, component, and/or source to a second location, device, component, and/or destination.

Figure 2:
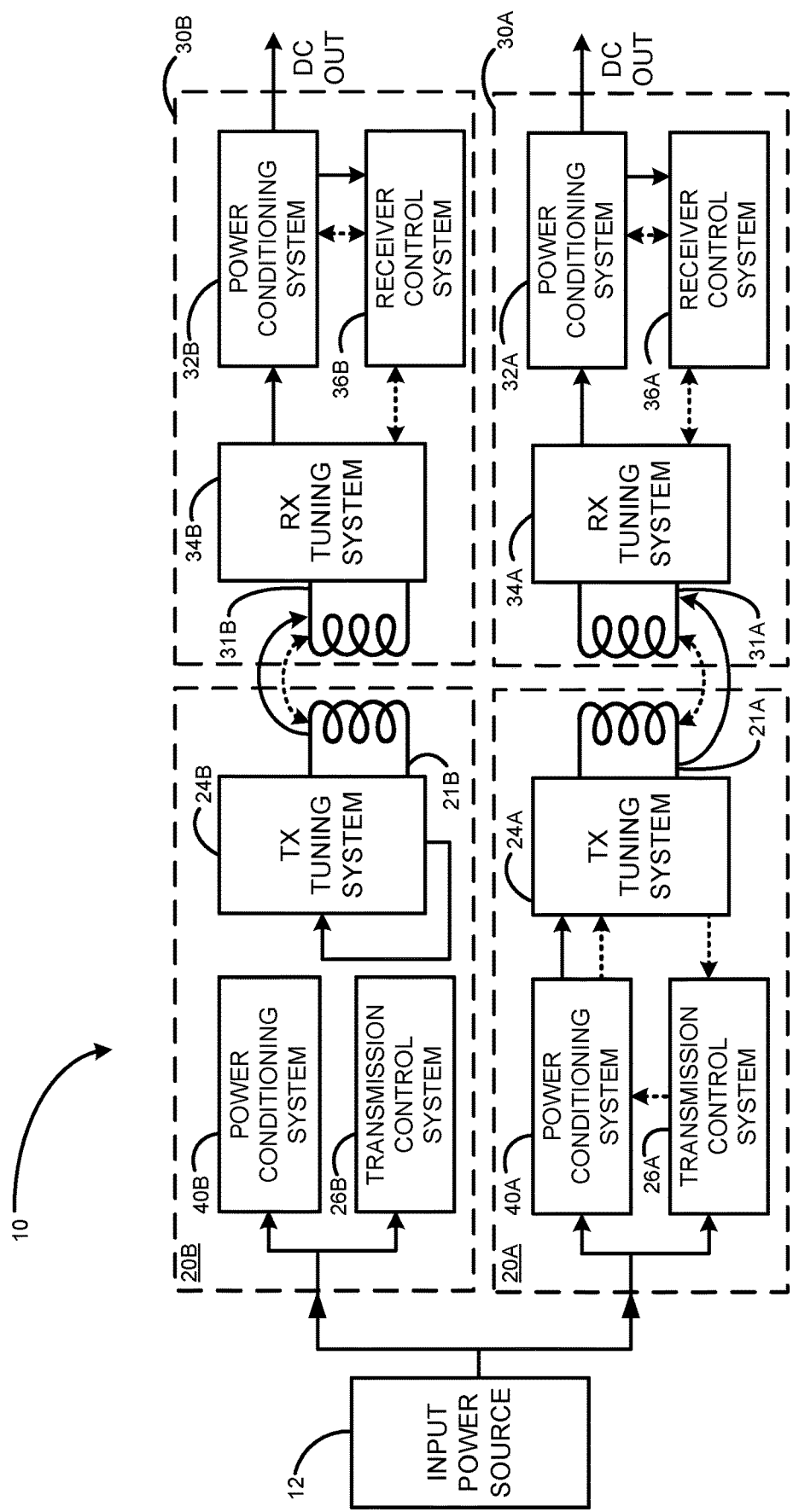
FIG. 2 is a block diagram illustrating components of a plurality of modular wireless transmission systems of the system of FIG. 1 and a plurality of wireless receiver systems of the system of FIG. 1, in accordance with FIG. 1 and the present disclosure.

Further, while FIGS. 1-2B may depict wireless power signals and wireless data signals transferring only from one antenna (e.g., a transmission antenna 21) to another antenna (e.g., a receiver antenna 31 and/or a transmission antenna 21), it is certainly possible that a transmitting antenna 21 may transfer electrical signals and/or couple with one or more other antennas and transfer, at least in part, components of the output signals or magnetic fields of the transmitting antenna 21. Such transmission may include secondary and/or stray coupling or signal transfer to multiple antennas of the system 10.

In some cases, the gap 17 may also be referenced as a "Z-Distance," because, if one considers an antenna 21, 31 each to be disposed substantially along respective common X-Y planes, then the distance separating the antennas 21, 31 is the gap in a "Z" or "depth" direction. However, flexible and/or non-planar coils are certainly contemplated by embodiments of the present disclosure and, thus, it is contemplated that the gap 17 may not be uniform, across an envelope of connection distances between the antennas 21, 31. It is contemplated that various tunings, configurations, and/or other parameters may alter the possible maximum distance of the gap 17, such that electrical transmission from the wireless transmission system 20 to the wireless receiver system 30 remains possible.

The wireless power transfer system 10 operates when one or both of the wireless transmission system 20/receiver system 30 pairs are coupled. As used herein, the terms "couples," "coupled," and "coupling" generally refer to magnetic field coupling, which occurs when a transmitter and/or any components thereof and a receiver and/or any components thereof are coupled to each other through a magnetic field. Such coupling may include coupling, represented by a coupling coefficient (k), that is at least sufficient for an induced electrical power signal, from a transmitter, to be harnessed by a receiver. Coupling of the wireless transmission system 20 and the wireless receiver system 30, in the system 10, may be represented by a resonant coupling coefficient of the system 10 and, for the purposes of wireless power transfer, the coupling coefficient for the system 10 may be in the range of about 0.01 and 0.9.

The input power source 12 may be operatively associated with a host device, which may be any electrically operated device, circuit board, electronic assembly, dedicated charging device, or any other contemplated electronic device. Example host devices, with which the wireless transmission systems 20A,B may be associated include, but are not limited to including, a device that comprises an integrated circuit, a portable computing device, storage medium for electronic devices, charging apparatus for one or multiple electronic devices, dedicated electrical charging devices, among other contemplated electronic devices.

The input power source 12 may be or may include one or more electrical storage devices, such as an electrochemical cell, a battery pack, and/or a capacitor, among other storage devices. Additionally or alternatively, the input power source 12 may be any electrical input source (e.g., any alternating current (AC) or direct current (DC) delivery port) and may include connection apparatus from said electrical input source to the wireless transmission system 20 (e.g., transformers, regulators, conductive conduits, traces, wires, or equipment, goods, computer, camera, mobile phone, and/or other electrical device connection ports and/or adaptors, such as but not limited to USB ports and/or adaptors, among other contemplated electrical components).

In FIG. 1, both wireless transmission systems 20A, B are physically in electrical connection with the input power source 12. As such, for the purposes of this disclosure, these wireless transmission systems 20A, B are referred to as a "input source connected wireless power transmitters." Electrical energy received by the wireless transmission systems 20A,B is used for at least two purposes, namely to provide electrical power to internal components of the wireless transmission systems 20A,B and to provide electrical power to the transmission antennas 21A,B. The transmission antennas 21A,B are configured to wirelessly transmit the electrical signals conditioned and modified for wireless transmission by the wireless transmission systems 20A,B via near-field magnetic coupling (NFMC). Near-field magnetic coupling enables the transfer of signals wirelessly through magnetic induction between a transmission antennas 21A,B and an associated one of the receiving antennas 31A,B.

Near-field magnetic coupling may be and/or be referred to as "inductive coupling," which, as used herein, is a wireless power transmission technique that utilizes an alternating electromagnetic field to transfer electrical energy between two antennas. Inductive coupling is a mechanism for near field wireless transmission of magnetic energy between two magnetically coupled coils that are tuned to resonate at a similar frequency. Accordingly, such near-field magnetic coupling may enable efficient wireless power transmission via resonant transmission of confined magnetic fields. Further, such near-field magnetic coupling may provide a bidirectional data connection via "mutual inductance," which, as defined herein, is the production of an electromotive force in a circuit by a change in current in a second circuit magnetically coupled to the first.

In one or more embodiments, the inductor coils of either the transmission antenna 21A,B or the receiver antenna 31A,B are strategically positioned to facilitate reception and/or transmission of wirelessly transferred electrical signals through near field magnetic induction. Antenna operating frequencies may comprise relatively high operating frequency ranges, examples of which may include, but are not limited to, 88-360 kHz, 6.78 MHZ (e.g., in accordance with the REZENCE and/or AIRFUEL interface standard and/or any other proprietary interface standard operating at a frequency of 6.78 MHZ), 13.56 MHZ (e.g., in accordance with the NFC standard, defined by ISO/IEC standard 18092), 27 MHZ, and/or an operating frequency of another proprietary operating mode. The operating frequencies of the antennas 21A,B, 31A,B may be operating frequencies designated by the International Telecommunications Union (ITU) in the Industrial, Scientific, and Medical (ISM) frequency bands, including not limited to 6.78 MHz, 13.56 MHZ, and 27 MHz, which are designated for use in wireless power transfer.

The transmitting antenna and the receiving antenna of the present disclosure may be configured to transmit and/or receive electrical power having a magnitude that ranges from about 10 milliwatts (mW) to about 500 watts (W). In one or more embodiments the inductor coil of the transmitting antenna 21A,B is configured to resonate at a transmitting antenna resonant frequency or within a transmitting antenna resonant frequency band.

As known to those skilled in the art, a "resonant frequency" or "resonant frequency band" refers a frequency or frequencies wherein amplitude response of the antenna is at a relative maximum, or, additionally or alternatively, the frequency or frequency band where the capacitive reactance has a magnitude substantially similar to the magnitude of the inductive reactance. In one or more embodiments, the transmitting antenna resonant frequency is at a high frequency, as known to those in the art of wireless power transfer.

The wireless receiver system 30A,B may be associated with at least one electronic device 14A,B, wherein the electronic device 14A,B may be any device that requires electrical power for any function and/or for power storage (e.g., via a battery and/or capacitor). Additionally, the electronic device 14A,B may be any device capable of receipt of electronically transmissible data. For example, the device may be, but is not limited to being, a handheld computing device, a mobile device, a portable appliance, a computer peripheral, an integrated circuit, an identifiable tag, a kitchen utility device, an electronic tool, an electric vehicle, a game console, a robotic device, a wearable electronic device (e.g., an electronic watch, electronically modified glasses, altered-reality (AR) glasses, virtual reality (VR) glasses, among other things), a portable scanning device, a portable identifying device, a sporting good, an embedded sensor, an Internet of Things (IoT) sensor, IoT enabled clothing, IoT enabled recreational equipment, industrial equipment, medical equipment, a medical device a tablet computing device, a portable control device, a remote controller for an electronic device, a gaming controller, among other things.

For the purposes of illustrating the features and characteristics of the disclosed embodiments, arrow-ended lines are utilized to illustrate transferrable and/or communicative signals and various patterns are used to illustrate electrical signals that are intended for power transmission and electrical signals that are intended for the transmission of data and/or control instructions. Solid lines indicate signal transmission of electrical energy over a physical and/or wireless power transfer, in the form of power signals that are, ultimately, utilized in wireless power transmission from the wireless transmission system 20A,B to the wireless receiver system 30A,B. Further, dotted lines are utilized to illustrate electronically transmittable data signals, which ultimately may be wirelessly transmitted from the wireless transmission system 20A,B to the wireless receiver system 30A,B.

While the systems and methods herein illustrate the transmission of wirelessly transmitted energy, wireless power signals, wirelessly transmitted power, wirelessly transmitted electromagnetic energy, and/or electronically transmittable data, it is certainly contemplated that the systems, methods, and apparatus disclosed herein may be utilized in the transmission of only one signal, various combinations of two signals, or more than two signals and, further, it is contemplated that the systems, method, and apparatus disclosed herein may be utilized for wireless transmission of other electrical signals in addition to or uniquely in combination with one or more of the above mentioned signals. In some examples, the signal paths of solid or dotted lines may represent a functional signal path, whereas, in practical application, the actual signal is routed through additional components in route to its indicated destination. For example, it may be indicated that a data signal routes from a communications apparatus to another communications apparatus; however, in practical application, the data signal may be routed through an amplifier, then through a transmission antenna, to a receiver antenna, where, on the receiver end, the data signal is decoded by a respective communications device of the receiver.

Turning now to FIG. 2, the wireless power transfer system 10 is illustrated as a block diagram including example sub-systems of both the wireless transmission systems 20A,B and the wireless receiver systems 30A.B. The wireless transmission systems 20A,B may include, at least, a power conditioning system 40A,B, a transmission control system 26A,B, a transmission tuning system 24A,B, and the transmission antenna 21A,B. A first portion of the electrical energy input from the input power source 12 may be configured to electrically power components of the wireless transmission system 20A,B such as, but not limited to, the transmission control system 26A.B. A second portion of the electrical energy input from the input power source 12 is conditioned and/or modified for wireless power transmission, to the wireless receiver system 30A,B, via the transmission antenna 21A,B. Accordingly, the second portion of the input energy is modified and/or conditioned by the power conditioning system 40A.B.

While not illustrated, it is certainly contemplated that one or both of the first and second portions of the input electrical energy may be modified, conditioned, altered, and/or otherwise changed prior to receipt by the power conditioning system 40A,B and/or transmission control system 26A.B, by further contemplated subsystems (e.g., a voltage regulator, a current regulator, switching systems, fault systems, safety regulators, among other things).

Figure 3:
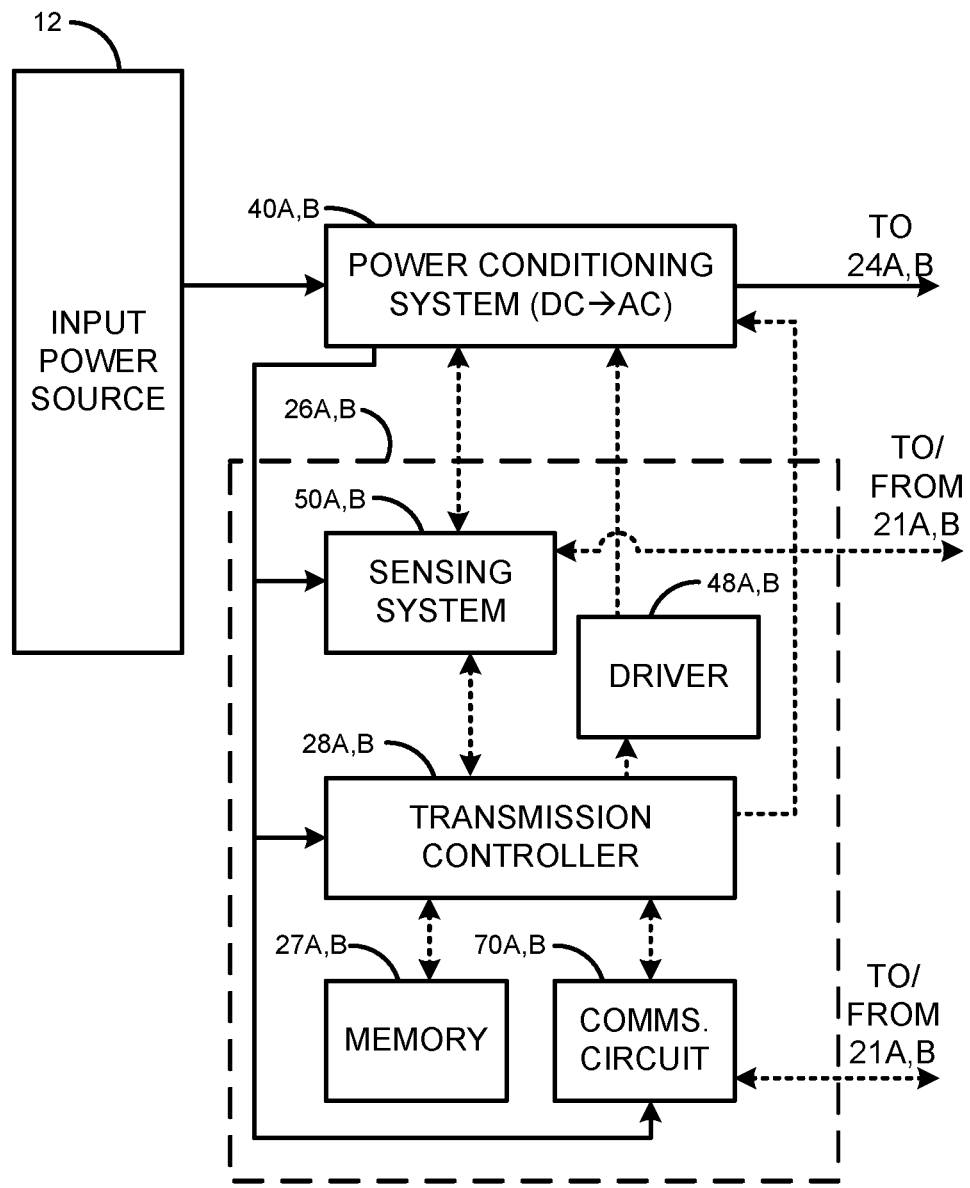
FIG. 3 is a block diagram illustrating components of a transmission control system of the wireless transmission system of FIGS. 2, in accordance with FIG. 1, FIG. 2, and the present disclosure.

Referring now to FIG. 3, with continued reference to FIGS. 1 and 2, subcomponents and/or systems of each transmission control system 26A,B are illustrated. The transmission control system 26A,B may include a sensing system 50A,B, a transmission controller 28A,B, a communications system 29A,B, a driver 48A,B, and a memory 27A,B.

The transmission controller 28A,B may be any electronic controller or computing system that includes, at least, a processor which performs operations, executes control algorithms, stores data, retrieves data, gathers data, controls and/or provides communication with other components and/or subsystems associated with the wireless transmission system 20A,B, and/or performs any other computing or controlling task desired. The transmission controller 28A,B may be a single controller or may include more than one controller disposed to control various functions and/or features of the wireless transmission system 20A.B. Functionality of the transmission controller 28A,B may be implemented in hardware and/or software and may rely on one or more data maps relating to the operation of the wireless transmission system 20A,B. To that end, the transmission controller 28A,B may be operatively associated with the memory 27A,B. The memory may include one or more of internal memory, external memory, and/or remote memory (e.g., a database and/or server operatively connected to the transmission controller 28A,B via a network, such as, but not limited to, the Internet). The internal memory and/or external memory may include, but are not limited to including, one or more of a read only memory (ROM), including programmable read-only memory (PROM), erasable programmable read-only memory (EPROM or sometimes but rarely labelled EROM), electrically erasable programmable read-only memory (EEPROM), random access memory (RAM), including dynamic RAM (DRAM), static RAM (SRAM), synchronous dynamic RAM (SDRAM), single data rate synchronous dynamic RAM (SDR SDRAM), double data rate synchronous dynamic RAM (DDR SDRAM, DDR2, DDR3, DDR4), and graphics double data rate synchronous dynamic RAM (GDDR SDRAM, GDDR2, GDDR3, GDDR4, GDDR5, a flash memory, a portable memory, and the like. Such memory media are examples of nontransitory machine readable and/or computer readable memory media.

While particular elements of the transmission control system 26A,B are illustrated as independent components and/or circuits (e.g., the driver 48A,B, the memory 27A,B, the communications system 29A,B, the sensing system 50A,B, among other contemplated elements) of the transmission control system 26A,B, such components may be integrated with the transmission controller 28A,B. In some examples, the transmission controller 28A,B may be an integrated circuit configured to include functional elements of one or both of the transmission controller 28A,B and the wireless transmission system 20A,B, generally.

As illustrated, the transmission controller 28A,B is in operative association, for the purposes of data transmission, receipt, and/or communication, with, at least, the memory 27A,B, the communications system 29A,B, the power conditioning system 40A,B, the driver 48A,B, and the sensing system 50A,B. The driver 48A,B may be implemented to control, at least in part, the operation of the power conditioning system 40A,B. In some examples, the driver 48A,B may receive instructions from the transmission controller 28A,B to generate and/or output a generated pulse width modulation (PWM) signal to the power conditioning system 40A,B. In some such examples, the PWM signal may be configured to drive the power conditioning system 40A,B to output electrical power as an alternating current signal, having an operating frequency defined by the PWM signal. In some examples, PWM signal may be configured to generate a duty cycle for the AC power signal output by the power conditioning system 40A.B. In some such examples, the duty cycle may be configured to be about 50% of a given period of the AC power signal.

The sensing system may include one or more sensors, wherein each sensor may be operatively associated with one or more components of the wireless transmission system 20A,B and configured to provide information and/or data. The term "sensor" is used in its broadest interpretation to define one or more components operatively associated with the wireless transmission system 20A,B that operate to sense functions, conditions, electrical characteristics, operations, and/or operating characteristics of one or more of the wireless transmission system 20A,B, the wireless receiving system 30A,B, the input power source 12, the host device 11, the transmission antenna 21A,B, the receiver antenna 31A, B, along with any other components and/or subcomponents thereof.

Figure 4:
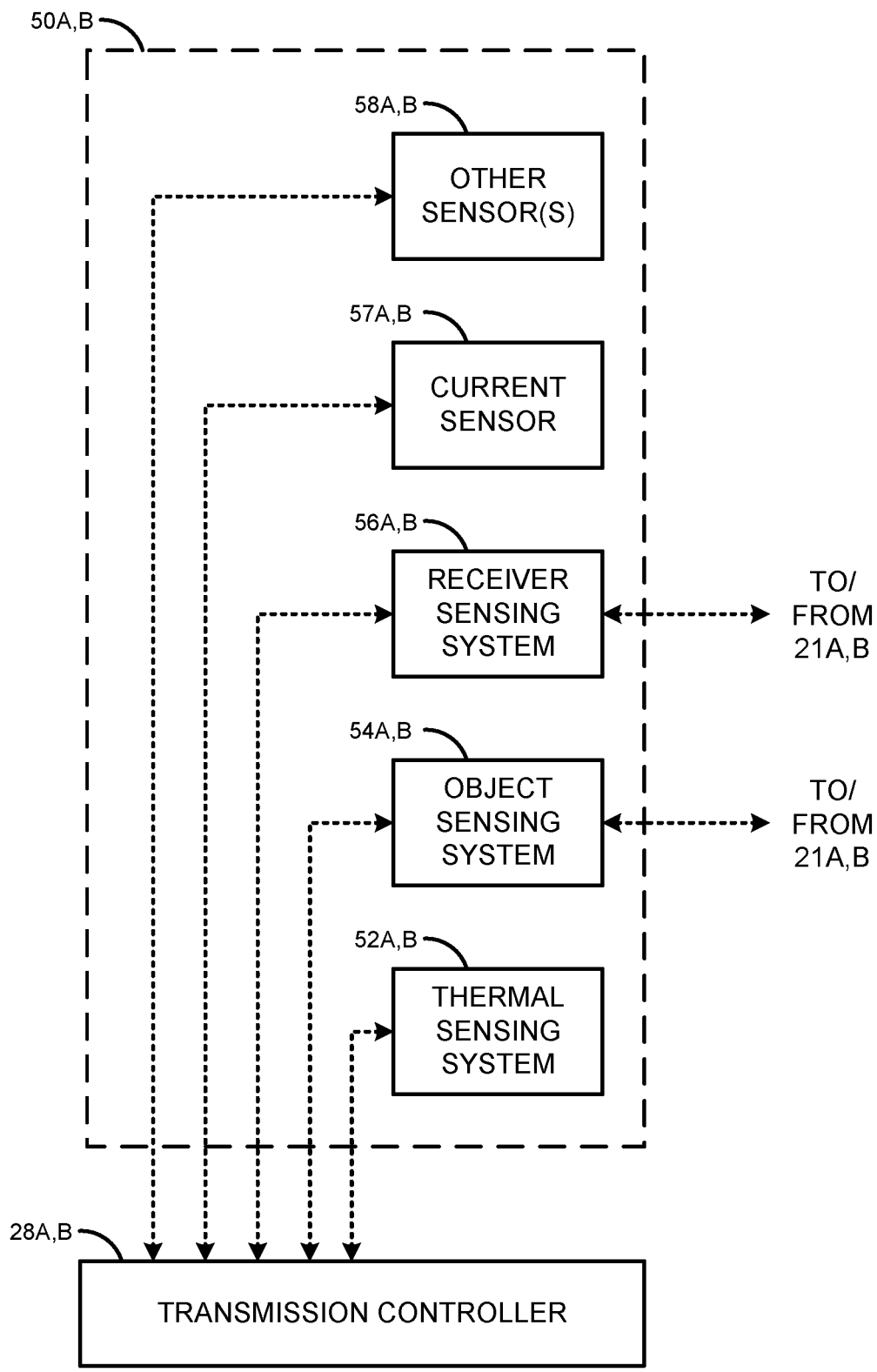
FIG. 4 is a block diagram illustrating components of a sensing system of the transmission control system of FIG. 3, in accordance with FIGS. 1-3 and the present disclosure.

As illustrated in the embodiment of FIG. 4, the sensing system 50A,B may include, but is not limited to including, a thermal sensing system 52A,B, an object sensing system 54A,B, a receiver sensing system 56A,B, a current sensor 57A,B, and/or any other sensor(s) 58A,B. Within these systems, there may exist even more specific optional additional or alternative sensing systems addressing particular sensing aspects required by an application, such as, but not limited to: a condition-based maintenance sensing system, a performance optimization sensing system, a state-of-charge sensing system, a temperature management sensing system, a component heating sensing system, an IoT sensing system, an energy and/or power management sensing system, an impact detection sensing system, an electrical status sensing system, a speed detection sensing system, a device health sensing system, among others. The object sensing system 54A,B, may be a foreign object detection (FOD) system.

Each of the thermal sensing system 52A,B, the object sensing system 54A,B, the receiver sensing system 56A,B, the current sensor 57A,B, and/or the other sensor(s) 58A,B, including the optional additional or alternative systems, are operatively and/or communicatively connected to the transmission controller 28. The thermal sensing system 52A,B is configured to monitor ambient and/or component temperatures within the wireless transmission system 20A,B or other elements nearby the wireless transmission system 20A,B. The thermal sensing system 52A,B may be configured to detect a temperature within the wireless transmission system 20A,B and, if the detected temperature exceeds a threshold temperature, the transmission controller 28A,B prevents the wireless transmission system 20A,B from operating. Such a threshold temperature may be configured for safety considerations, operational considerations, efficiency considerations, and/or any combinations thereof. In a non-limiting example, if, via input from the thermal sensing system 52A,B, the transmission controller 28A,B determines that the temperature within the wireless transmission system 20A,B has increased from an acceptable operating temperature to an undesired operating temperature (e.g., in a non-limiting example, the internal temperature increasing from about 20° Celsius (C) to about 50° C., the transmission controller 28A,B prevents the operation of the wireless transmission system 20A,B and/or reduces levels of power output from the wireless transmission system 20A,B. In some non-limiting examples, the thermal sensing system 52A,B may include one or more of a thermocouple, a thermistor, a negative temperature coefficient (NTC) resistor, a resistance temperature detector (RTD), and/or any combinations thereof.

As depicted in FIG. 4, the transmission sensing system 50A,B may include the object sensing system 54A,B. The object sensing system 54A,B may be configured to detect one or more of the wireless receiver system 30A,B and/or the receiver antenna 31A,B, thus indicating to the transmission controller 28A,B that the receiver system 30A,B is proximate to the wireless transmission system 20A,B. Additionally or alternatively, the object sensing system 54A,B may be configured to detect presence of unwanted objects in contact with or proximate to the wireless transmission system 20A,B. In some examples, the object sensing system 54A,B is configured to detect the presence of an undesired object. In some such examples, if the transmission controller 28A,B, via information provided by the object sensing system 54A,B, detects the presence of an undesired object, then the transmission controller 28A,B prevents or otherwise modifies operation of the wireless transmission system 20A,B. In some examples, the object sensing system 54A,B utilizes an impedance change detection scheme, in which the transmission controller 28A,B analyzes a change in electrical impedance observed by the transmission antenna 20A,B against a known, acceptable electrical impedance value or range of electrical impedance values.

Additionally or alternatively, the object sensing system 54A,B may utilize a quality factor (Q) change detection scheme, in which the transmission controller 28A,B analyzes a change from a known quality factor value or range of quality factor values of the object being detected, such as the receiver antenna 31A,B. The "quality factor" or "Q" of an inductor can be defined as (frequency (Hz)xinductance (H))/resistance (ohms), where frequency is the operational frequency of the circuit, inductance is the inductance output of the inductor and resistance is the combination of the radiative and reactive resistances that are internal to the inductor. "Quality factor." as defined herein, is generally accepted as an index (figure of measure) that measures the efficiency of an apparatus like an antenna, a circuit, or a resonator. In some examples, the object sensing system 54A,B may include one or more of an optical sensor, an electro-optical sensor, a Hall effect sensor, a proximity sensor, and/or any combinations thereof. In some examples, the quality factor measurements, described above, may be performed when the wireless power transfer system 10 is performing in band communications.

The receiver sensing system 56A.B is any sensor, circuit, and/or combinations thereof configured to detect presence of any wireless receiving system that may be couplable with the wireless transmission system 20A,B. In some examples, the receiver sensing system 56A,B and the object sensing system 54A,B may be combined, may share components, and/or may be embodied by one or more common components. In some examples, if the presence of any such wireless receiving system is detected, wireless transmission of electrical energy, electrical power, electromagnetic energy, and/or data by the wireless transmission system 20A,B to said wireless receiving system is enabled. In some examples, if the presence of a wireless receiver system is not detected, continued wireless transmission of electrical energy, electrical power, electromagnetic energy, and/or data is prevented from occurring. Accordingly, the receiver sensing system 56A,B may include one or more sensors and/or may be operatively associated with one or more sensors that are configured to analyze electrical characteristics within an environment of or proximate to the wireless transmission system 28A,B and, based on the electrical characteristics, determine presence of a wireless receiver system 30A,B.

Figure 5:
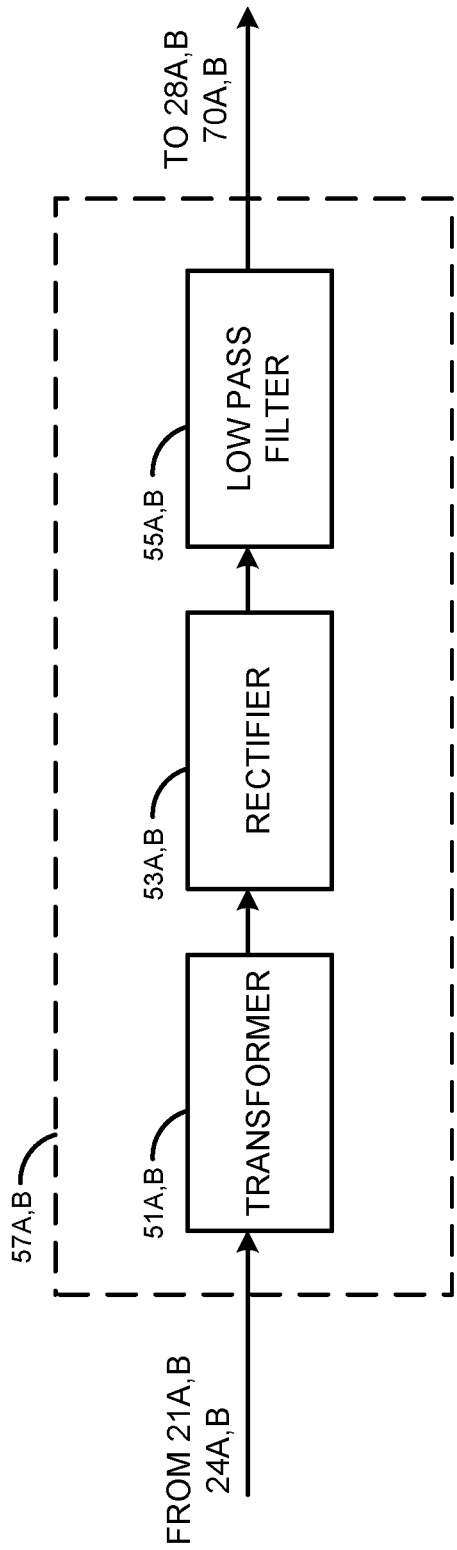
FIG. 5 is a block diagram for an example low pass filter of the sensing system of FIG. 4, in accordance with FIGS. 1-4 and the present disclosure.

The current sensor 57A,B may be any sensor configured to determine electrical information from an electrical signal, such as a voltage or a current, based on a current reading at the current sensor 57A,B. Components of an example current sensor 57A,B are further illustrated in FIG. 5, which is a block diagram for the current sensor 57A.B. The current sensor 57A,B may include a transformer 51A,B, a rectifier 53A,B, and/or a low pass filter 55A,B, to process the AC wireless signals, transferred via coupling between the wireless receiver systems 20A,B and wireless transmission systems 30A,B, to determine or provide information to derive a current ($I_{Tx}$) or voltage ($V_{Tx}$) at the transmission antennas 21A,B. The transformer 51A,B may receive the AC wireless signals and either step up or step down the voltage of the AC wireless signal, such that it can properly be processed by the current sensor. The rectifier 53A,B may receive the transformed AC wireless signal and rectify the signal, such that any negative remaining in the transformed AC wireless signal are either eliminated or converted to opposite positive voltages, to generate a rectified AC wireless signal. The low pass filter 55A,B is configured to receive the rectified AC wireless signal and filter out AC components (e.g., the operating or carrier frequency of the AC wireless signal) of the rectified AC wireless signal, such that a DC voltage is output for the current ($I_{Tx}$) and/or voltage ($V_{Tx}$) at the transmission antennas 21A,B.

Figure 6:
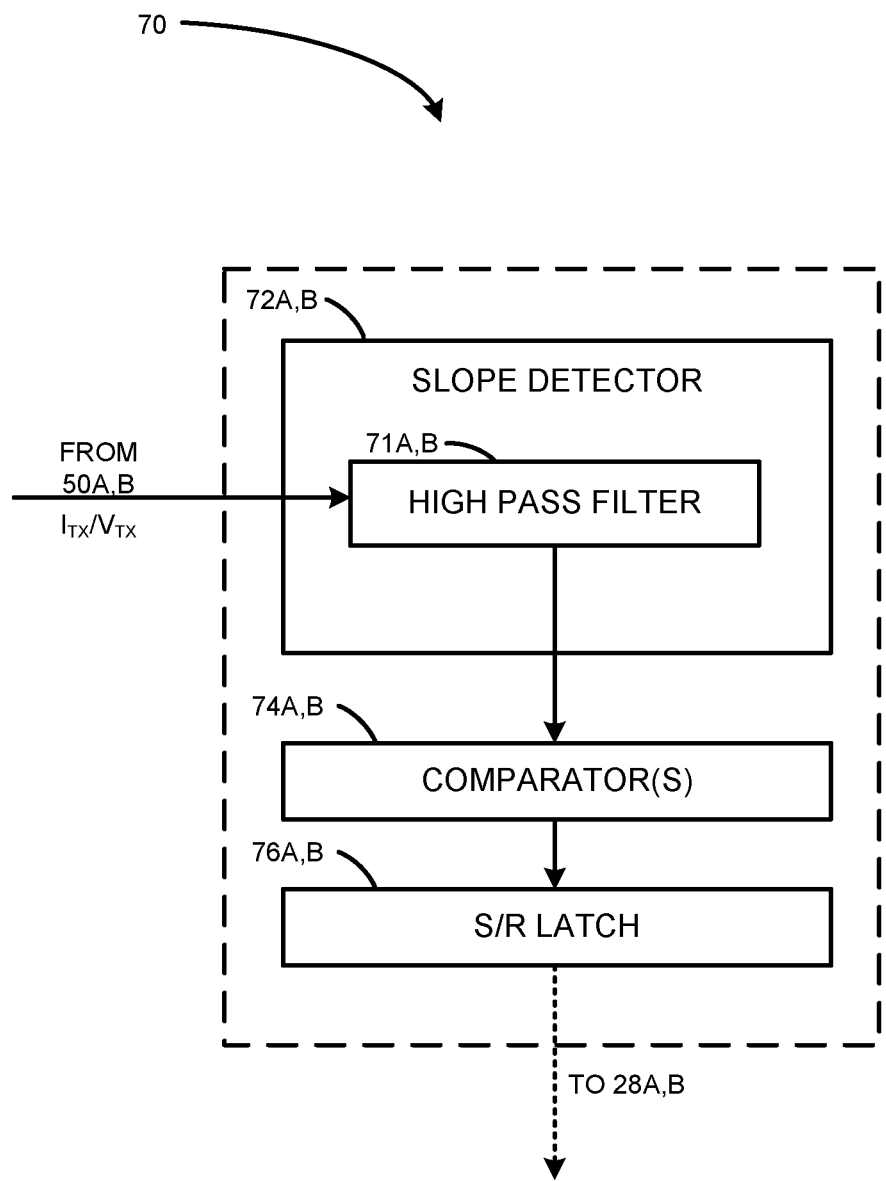
FIG. 6 is a block diagram illustrating components of a demodulation circuit for the wireless transmission system of FIGS. 2, in accordance with FIGS. 1-4 and the present disclosure.

FIG. 6 is a block diagram for a demodulation circuit 70A,B for the wireless transmission systems 20A,B, which is used by the wireless transmission systems 20A,B to simplify or decode components of wireless data signals of an alternating current (AC) wireless signal, prior to transmission of the wireless data signal to the transmission controller 28A,B. The demodulation circuit includes, at least, a slope detector 72A,B and a comparator 74A,B. In some examples, the demodulation circuit 70A,B includes a set/reset (SR) latch 76A,B. In some examples, the demodulation circuit 70A,B may be an analog circuit comprised of one or more passive components (e.g., resistors, capacitors, inductors, diodes, among other passive components) and/or one or more active components (e.g., operational amplifiers, logic gates, among other active components). Alternatively, it is contemplated that the demodulation circuit 70A,B and some or all of its components may be implemented as an integrated circuit (IC). In either an analog circuit or IC, it is contemplated that the demodulation circuit may be external of the transmission controller 28A,B and is configured to provide information associated with wireless data signals transmitted from the wireless receiver system 30 to the wireless transmission system 20A,B.

The demodulation circuit 70A,B is configured to receive electrical information (e.g., $I_{Tx}$, $V_{Tx}$) from at least one sensor (e.g., a sensor of the sensing system 50A,B), detect a change in such electrical information, determine if the change in the electrical information meets or exceeds one of a rise threshold or a fall threshold. If the change exceeds one of the rise threshold or the fall threshold, the demodulation circuit 70A,B generates an alert, and, outputs a plurality of data alerts. Such data alerts are received by the transmitter controller 28A,B and decoded by the transmitter controller 28A,B to determine the wireless data signals. In other words, the demodulation circuit 70A,B is configured to monitor the slope of an electrical signal (e.g., slope of a voltage at the power conditioning system 32A,B of a wireless receiver system 30A,B) and output an alert if said slope exceeds a maximum slope threshold or undershoots a minimum slope threshold.

Such slope monitoring and/or slope detection by the communications system 70A,B is particularly useful when detecting or decoding an amplitude shift keying (ASK) signal that encodes the wireless data signals in-band of the wireless power signal at the operating frequency. In an ASK signal, the wireless data signals are encoded by damping the voltage of the magnetic field between the wireless transmission system 20A,B and the wireless receiver system 30A,B. Such damping and subsequent re-rising of the voltage in the field is performed based on an encoding scheme for the wireless data signals (e.g., binary coding, Manchester coding, pulse-width modulated coding, among other known or novel coding systems and methods). The receiver of the wireless data signals (e.g., the wireless transmission system 20A,B) must then detect rising and falling edges of the voltage of the field and decode said rising and falling edges to receive the wireless data signals.

While in a theoretical, ideal scenario, an ASK signal will rise and fall instantaneously, with no slope between the high voltage and the low voltage for ASK modulation; however, in physical reality, there is some time that passes when the ASK signal transitions from the "high" voltage to the "low" voltage. Thus, the voltage or current signal sensed by the demodulation circuit 70A,B will have some, knowable slope or rate of change in voltage when transitioning from the high ASK voltage to the low ASK voltage. By configuring the demodulation circuit 70A,B to determine when said slope meets, overshoots and/or undershoots such rise and fall thresholds, known for the slope when operating in the system 10, the demodulation circuit 70A,B can accurately detect rising and falling edges of the ASK signal.

Thus, a relatively inexpensive and/or simplified circuit may be utilized to, at least partially, decode ASK signals down to alerts for rising and falling instances. So long as the transmission controller 28A,B is programmed to understand the coding schema of the ASK modulation, the transmission controller 28A,B will expend far less computational resources than it would if it had to decode the leading and falling edges directly from an input current or voltage sense signal from the sensing system 50A,B. To that end, as the computational resources required by the transmission controller 28A,B to decode the wireless data signals are significantly decreased due to the inclusion of the demodulation circuit 70A,B, the demodulation circuit 70A,B may significantly reduce BOM of the wireless transmission system 20A,B, by allowing usage of cheaper, less computationally capable processor(s) for or with the transmission controller 28A,B.

The demodulation circuit 70A,B may be particularly useful in reducing the computational burden for decoding data signals, at the transmitter controller 28A,B, when the ASK wireless data signals are encoded/decoded utilizing a pulse-width encoded ASK signals, in-band of the wireless power signals. A pulse-width encoded ASK signal refers to a signal wherein the data is encoded as a percentage of a period of a signal. For example, a two-bit pulse width encoded signal may encode a start bit as 20% of a period between high edges of the signal, encode "1" as 40% of a period between high edges of the signal, and encode "0" as 60% of a period between high edges of the signal, to generate a binary encoding format in the pulse width encoding scheme. Thus, as the pulse width encoding relies solely on monitoring rising and falling edges of the ASK signal, the periods between rising times need not be constant and the data signals may be asynchronous or "unclocked." Examples of pulse width encoding and systems and methods to perform such pulse width encoding are explained in greater detail in U.S. patent application Ser. No. 16/735,342 titled "Systems and Methods for Wireless Power Transfer Including Pulse Width Encoded Data Communications," to Michael Katz, which is commonly owned by the owner of the instant application and is hereby incorporated by reference.

Figure 7:
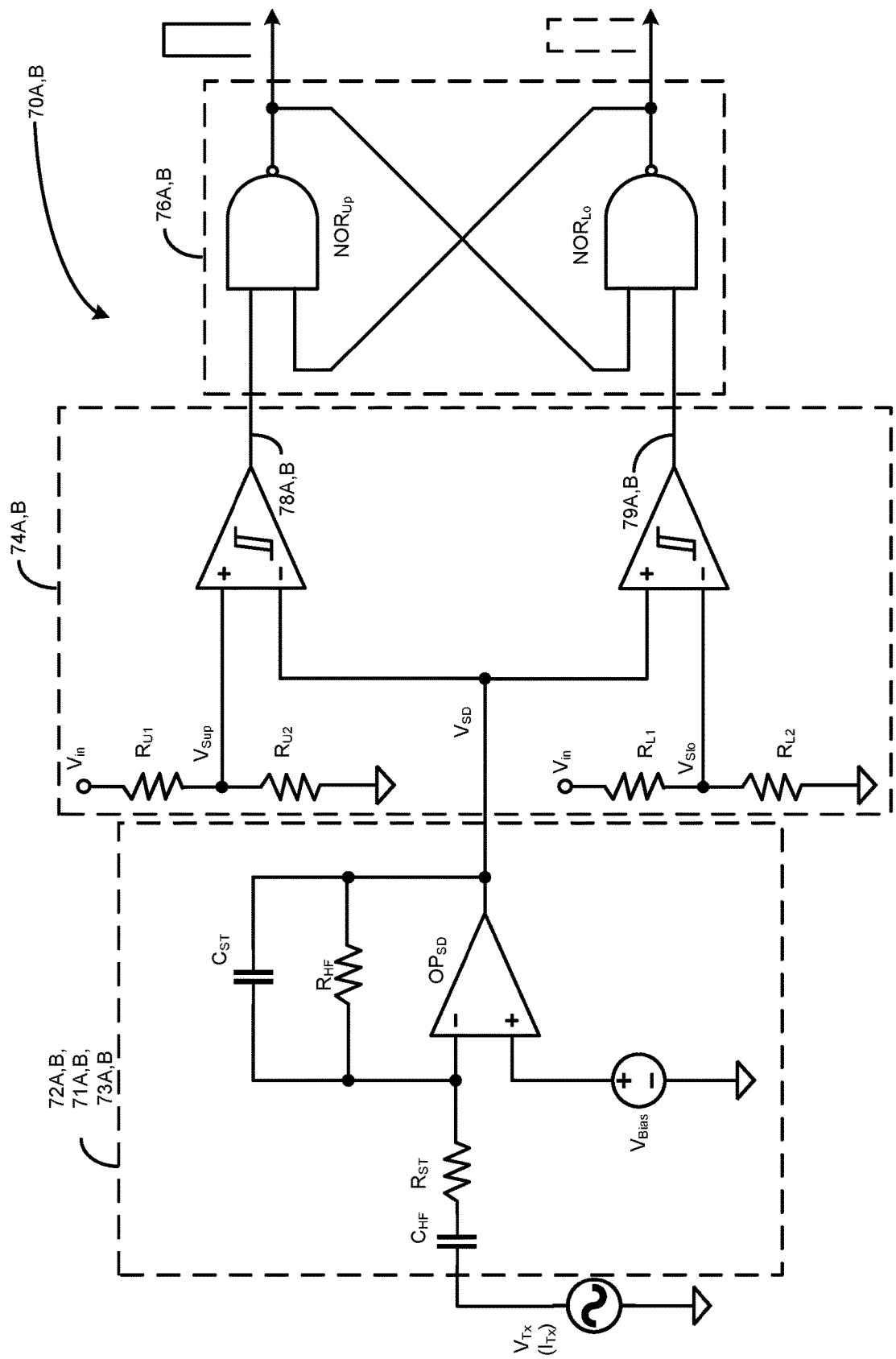
FIG. 7 is an electrical schematic diagram for the demodulation circuit of FIG. 6, in accordance with FIGS. 1-6 and the present disclosure.
Figure 8:
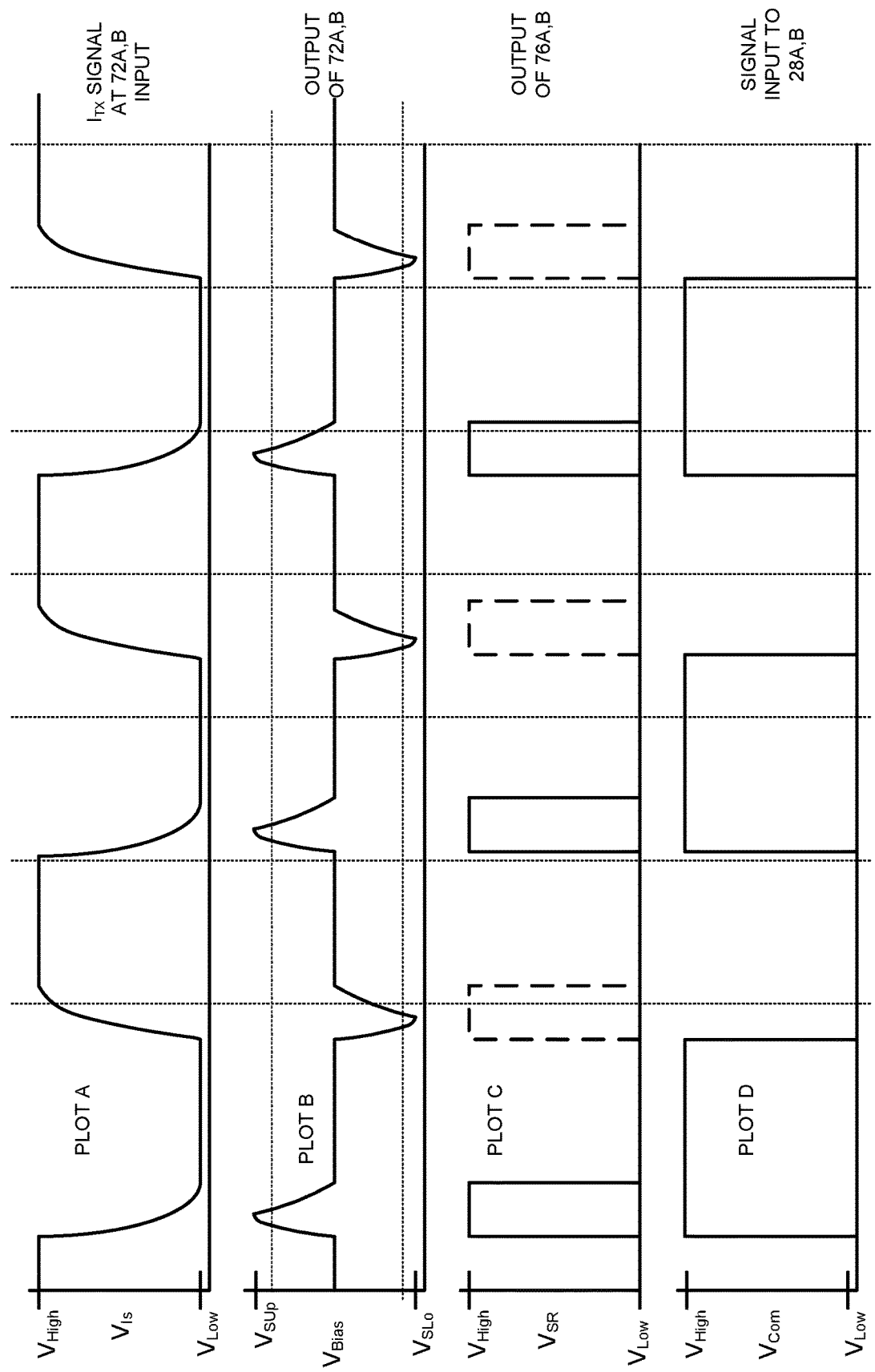
FIG. 8 is a timing diagram for voltages of an electrical signal, as it travels through the demodulation circuit, in accordance with FIGS. 1-7 and the present disclosure.

Turning now to FIG. 7, with continued reference to FIG. 6, an electrical schematic diagram for the demodulation circuit 70A,B is illustrated. Additionally, reference will be made to FIG. 8, which is an exemplary timing diagram illustrating signal shape or waveform at various stages or sub-circuits of the demodulation circuit 70A,B. The input signal to the demodulation circuit 70A,B is illustrated in FIG. 7 as Plot A, showing rising and falling edges from a "high" voltage ($V_{High}$) on the transmission antenna 21A,B to a "low" voltage ($V_{Low}$) on the transmission antenna 21A,B. The voltage signal of Plot A may be derived from, for example, a current ($I_{Tx}$) sensed at the transmission antenna 21A,B by one or more sensors of the sensing system 50A,B. Such rises and falls from $V_{High}$ to $V_{Low}$ may be caused by load modulation, performed at the wireless receiver system(s) 30A,B, to modulate the wireless power signals to include the wireless data signals via ASK modulation. As illustrated, the voltage of Plot A does not cleanly rise and fall when the ASK modulation is performed; rather, a slope or slopes, indicating rate(s) of change, occur during the transitions from $V_{High}$ to $V_{Low}$ and vice versa.

As illustrated in FIG. 7, the slope detector 72A,B includes a high pass filter 71A,B, an operation amplifier (OpAmp) $OP_{SD}$, and an optional stabilizing circuit 73A,B. The high pass filter 71A,B is configured to monitor for higher frequency components of the AC wireless signals and may include, at least, a filter capacitor ($C_{HF}$) and a filter resistor ($R_{HF}$). The values for $C_{HF}$ and $R_{HF}$ are selected and/or tuned for a desired cutoff frequency for the high pass filter 71A,B. In some examples, the cutoff frequency for the high pass filter 71A,B may be selected as a value greater than or equal to about 1-2 kHz, to ensure adequately fast slope detection by the slope detector 72A,B, when the operating frequency of the system 10 is on the order of MHZ (e.g., an operating frequency of about 6.78 MHZ). In some examples, the high pass filter 71A,B is configured such that harmonic components of the detected slope are unfiltered. In view of the current sensor 57A,B of FIG. 5, the high pass filter 71A,B and the low pass filter 55, in combination, may function as a bandpass filter for the demodulation circuit 70A,B.

$OP_{SD}$ is any operational amplifier having an adequate bandwidth for proper signal response, for outputting the slope of $V_{Tx}$, but low enough to attenuate components of the signal that are based on the operating frequency and/or harmonics of the operating frequency. Additionally or alternatively, $OP_{SD}$ may be selected to have a small input voltage range for $V_{Tx}$, such that $OP_{SD}$ may avoid unnecessary error or clipping during large changes in voltage at $V_{Tx}$. Further, an input bias voltage ($V_{Bias}$) for $OP_{SD}$ may be selected based on values that ensure $OP_{SD}$ will not saturate under boundary conditions (e.g., steepest slopes, largest changes in $V_{Tx}$). It is to be noted, and is illustrated in Plot B of FIG. 8, that when no slope is detected, the output of the slope detector 72A,B will be $V_{Bias}$.

As the passive components of the slope detector 72A,B will set the terminals and zeroes for a transfer function of the slope detector 72A,B, such passive components must be selected to ensure stability. To that end, if the desired and/or available components selected for $C_{HF}$ and $R_{HF}$ do not adequately set the terminals and zeros for the transfer function, additional, optional stability capacitor(s) $C_{ST}$ may be placed in parallel with $R_{HF}$ and stability resistor RST may be placed in the input path to $OP_{SD}$.

Output of the slope detector 72A,B (Plot B representing $V_{sD}$) may approximate the following equation:

$$V_{SD} = -R_{HF}C_{HF}\frac{dV}{dt} + V_{Bias}$$

Thus, $V_{sD}$ will approximate to $V_{Bias}$, when no change in voltage (slope) is detected, and $V_{sD}$ will output the change in voltage (dV/dt), as scaled by the high pass filter 71A,B, when $V_{Tx}$ rises and falls between the high voltage and the low voltage of the ASK modulation. The output of the slope detector 72A,B, as illustrated in Plot B, may be a pulse, showing slope of $V_{Tx}$ rise and fall.

$V_{sD}$ is output to the comparator circuit(s) 74A,B, which is configured to receive $V_{sD}$, compare $V_{sD}$ to a rising rate of change for the voltage ($V_{sUp}$) and a falling rate of change for the voltage ($V_{SLo}$). If $V_{sD}$ exceeds or meets $V_{sUp}$, then the comparator circuit will determine that the change in $V_{Tx}$ meets the rise threshold and indicates a rising edge in the ASK modulation. If $V_{sD}$ goes below or meets $V_{SLow}$, then the comparator circuit will determine that the change in $V_{Tx}$ meets the fall threshold and indicates a falling edge of the ASK modulation. It is to be noted that $V_{sUp}$ and $V_{sLo}$ may be selected to ensure a symmetrical triggering.

In some examples, such as the comparator circuit 74A,B illustrated in FIG. 6, the comparator circuit 74A,B may comprise a window comparator circuit. In such examples, the $V_{sUp}$ and $V_{sLo}$ may be set as a fraction of the power supply determined by resistor values of the comparator circuit 74A,B. In some such examples, resistor values in the comparator circuit may be configured such that $$V_{Sup} = V_{in}\left[\frac{R_{U2}}{R_{U1} + R_{U2}}\right]$$

$$V_{SLo} = V_{in}\left[\frac{R_{L2}}{R_{L1} + R_{L2}}\right]$$

where Vin is a power supply determined by the comparator circuit 74A,B. When $V_{sD}$ exceeds the set limits for $V_{sup}$ or $V_{SLo}$, the comparator circuit 74A,B triggers and pulls the output ($V_{Cout}$) low.

Further, while the output of the comparator circuit 74A,B could be output to the transmission controller 28A,B and utilized to decode the wireless data signals by signaling the rising and falling edges of the ASK modulation, in some examples, the SR latch 76A,B may be included to add noise reduction and/or a filtering mechanism for the slope detector 72A,B. The SR latch 76A,B may be configured to latch the signal (Plot C) in a steady state to be read by the transmitter controller 28A,B, until a reset is performed. In some examples, the SR latch 76A,B may perform functions of latching the comparator signal and serve as an inverter to create an active high alert out signal. Accordingly, the SR latch 76A,B may be any SR latch known in the art configured to sequentially excite when the system detects a slope or other modulation excitation. As illustrated, the SR latch 76A,B may include NOR gates, wherein such NOR gates may be configured to have an adequate propagation delay for the signal. For example, the SR latch 76A,B may include two NOR gates ($NOR_{Up}$, $NOR_{Lo}$), each NOR gate operatively associated with the upper voltage output 78A,B of the comparator 74A,B and the lower voltage output 79A,B of the comparator 74A,B.

In some examples, such as those illustrated in Plot C, a reset of the SR latch 76A,B is triggered when the comparator circuit 74A,B outputs detection of $V_{sUp}$ (solid plot on Plot C) and a set of the SR latch 76A,B is triggered when the comparator circuit 74A,B outputs $V_{SLo}$ (dashed plot on Plot C). Thus, the reset of the SR latch 76A,B indicates a falling edge of the ASK modulation and the set of the SR latch 76A,B indicates a rising edge of the ASK modulation. Accordingly, as illustrated in Plot D, the rising and falling edges, indicated by the demodulation circuit 70A,B, are input to the transmission controller 28A,B as alerts, which are decoded to determine the received wireless data signal transmitted, via the ASK modulation, from the wireless receiver system(s) 30A,B.

Figure 9:
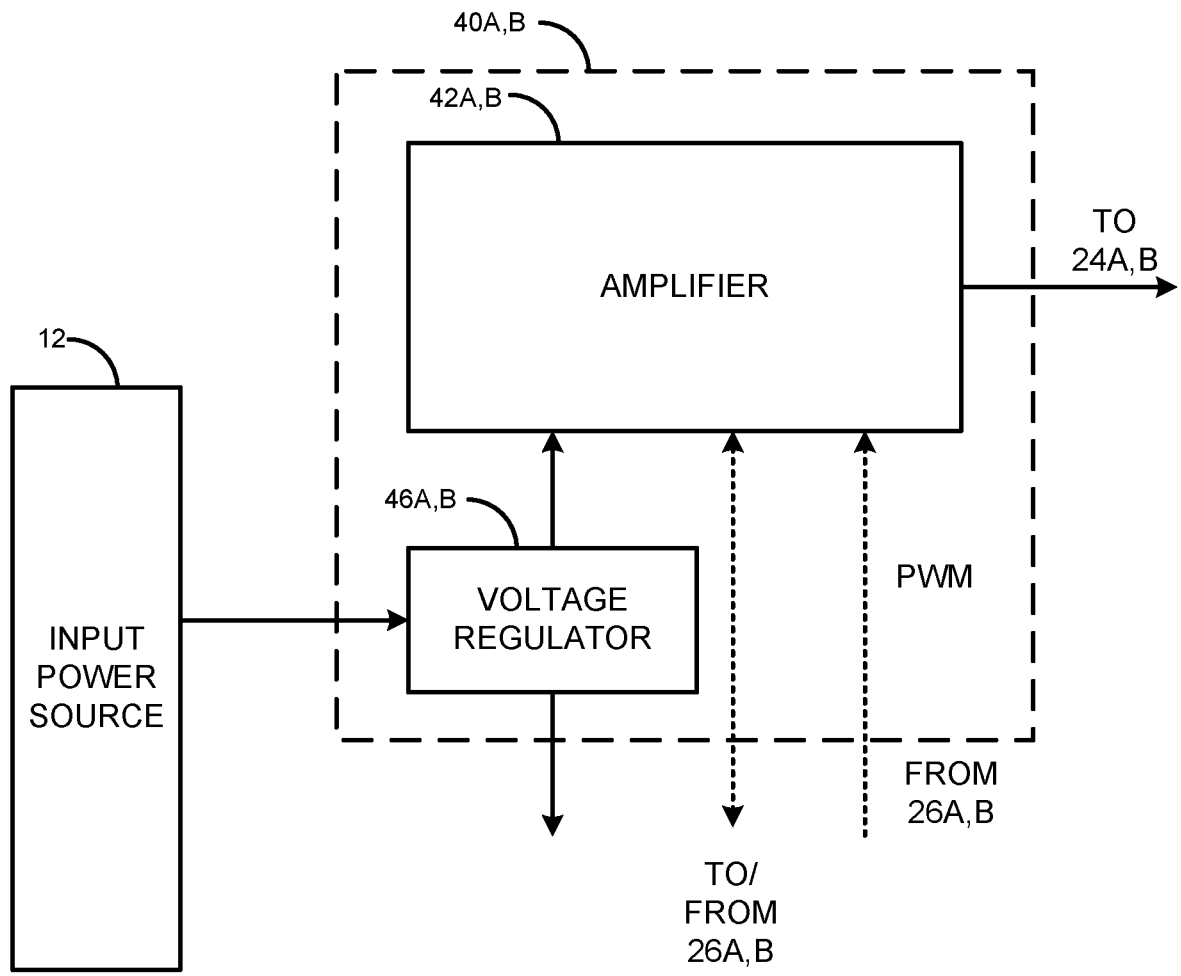
FIG. 9 is a block diagram illustrating components of a power conditioning system of the wireless transmission system of FIG. 2, in accordance with FIG. 1, FIG. 2, and the present disclosure.

Referring now to FIG. 9, and with continued reference to FIGS. 1-5, a block diagram illustrating an embodiment of the power conditioning system 40A,B is illustrated. At the power conditioning system 40A,B, electrical power is received, generally, as a DC power source, via the input power source 12 itself or an intervening power converter, converting an AC source to a DC source (not shown). A voltage regulator 46A,B receives the electrical power from the input power source 12 and is configured to provide electrical power for transmission by the antenna 21A,B and provide electrical power for powering components of the wireless transmission system 21A,B. Accordingly, the voltage regulator 46A,B is configured to convert the received electrical power into at least two electrical power signals, each at a proper voltage for operation of the respective downstream components: a first electrical power signal to electrically power any components of the wireless transmission system 20A,B and a second portion conditioned and modified for wireless transmission to the wireless receiver system 30A,B. As illustrated in FIG. 3, such a first portion is transmitted to, at least, the sensing system 50A,B, the transmission controller 28A,B, and the communications system 29A,B; however, the first portion is not limited to transmission to just these components and can be transmitted to any electrical components of the wireless transmission system 20A,B.

The second portion of the electrical power is provided to an amplifier 42A,B of the power conditioning system 40A,B, which is configured to condition the electrical power for wireless transmission by the antenna 21A,B. The amplifier may function as an invertor, which receives an input DC power signal from the voltage regulator 46A,B and generates an AC as output, based, at least in part, on PWM input from the transmission control system 26A,B. The amplifier 42A,B may be or include, for example, a power stage invertor, such as a single field effect transistor (FET), a dual field effect transistor power stage invertor or a quadruple field effect transistor power stage invertor. The use of the amplifier 42A,B within the power conditioning system 40A,B and, in turn, the wireless transmission system 20A,B enables wireless transmission of electrical signals having much greater amplitudes than if transmitted without such an amplifier. For example, the addition of the amplifier 42A,B may enable the wireless transmission system 20A,B to transmit electrical energy as an electrical power signal having electrical power from about 10 mW to about 500 W. In some examples, the amplifier 42A,B may be or may include one or more class-E power amplifiers. Class-E power amplifiers are efficiently tuned switching power amplifiers designed for use at high frequencies (e.g., frequencies from about 1 MHz to about 1 GHZ). Generally, a single-ended class-E amplifier employs a single-terminal switching element and a tuned reactive network between the switch and an output load (e.g., the antenna 21A,B). Class E amplifiers may achieve high efficiency at high frequencies by only operating the switching element at points of zero current (e.g., on-to-off switching) or zero voltage (off to on switching). Such switching characteristics may minimize power lost in the switch, even when the switching time of the device is long compared to the frequency of operation. However, the amplifier 42A,B is certainly not limited to being a class-E power amplifier and may be or may include one or more of a class D amplifier, a class EF amplifier, an H invertor amplifier, and/or a push-pull invertor, among other amplifiers that could be included as part of the amplifier 42A,B.

Figure 10:
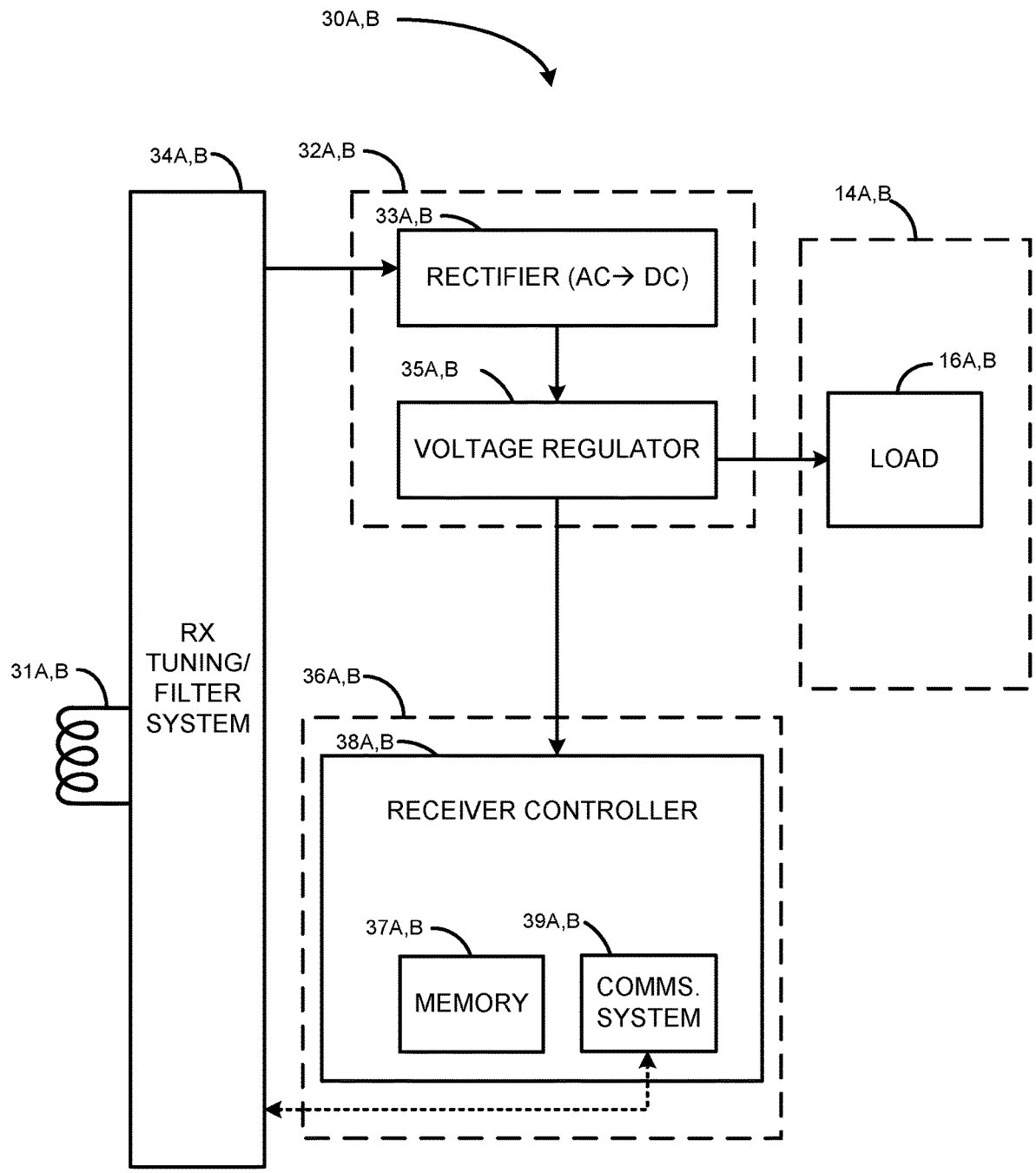
FIG. 10 is a block diagram illustrating components of a receiver control system and a receiver power conditioning system of the wireless receiver system of FIG. 2, in accordance with FIG. 1, FIG. 2, and the present disclosure.

Turning now to FIG. 10 and with continued reference to, at least, FIGS. 1 and 2, the wireless receiver system 30A,B is illustrated in further detail. The wireless receiver system 30A,B is configured to receive, at least, electrical energy, electrical power, electromagnetic energy, and/or electrically transmittable data via near field magnetic coupling from the wireless transmission system 20A,B, via the transmission antenna 21A,B. As illustrated in FIG. 9, the wireless receiver system 30A,B includes, at least, the receiver antenna 31A,B, a receiver tuning and filtering system 34A,B, a power conditioning system 32A,B, a receiver control system 36A,B, and a voltage isolation circuit 70A,B. The receiver tuning and filtering system 34A,B may be configured to substantially match the electrical impedance of the wireless transmission system 20A,B. In some examples, the receiver tuning and filtering system 34A,B may be configured to dynamically adjust and substantially match the electrical impedance of the receiver antenna 31A,B to a characteristic impedance of the power generator or the load at a driving frequency of the transmission antenna 20A,B.

As illustrated, the power conditioning system 32A,B includes a rectifier 33A,B and a voltage regulator 35A.B. In some examples, the rectifier 33A,B is in electrical connection with the receiver tuning and filtering system 34A,B. The rectifier 33A,B is configured to modify the received electrical energy from an alternating current electrical energy signal to a direct current electrical energy signal. In some examples, the rectifier 33A,B is comprised of at least one diode. Some non-limiting example configurations for the rectifier 33A,B include, but are not limited to including, a full wave rectifier, including a center tapped full wave rectifier and a full wave rectifier with filter, a half wave rectifier, including a half wave rectifier with filter, a bridge rectifier, including a bridge rectifier with filter, a split supply rectifier, a single phase rectifier, a three phase rectifier, a voltage doubler, a synchronous voltage rectifier, a controlled rectifier, an uncontrolled rectifier, and a half controlled rectifier. As electronic devices may be sensitive to voltage, additional protection of the electronic device may be provided by clipper circuits or devices. In this respect, the rectifier 33A,B may further include a clipper circuit or a clipper device, which is a circuit or device that removes either the positive half (top half), the negative half (bottom half), or both the positive and the negative halves of an input AC signal. In other words, a clipper is a circuit or device that limits the positive amplitude, the negative amplitude, or both the positive and the negative amplitudes of the input AC signal.

Some non-limiting examples of a voltage regulator 35A,B include, but are not limited to, including a series linear voltage regulator, a buck convertor, a low dropout (LDO) regulator, a shunt linear voltage regulator, a step up switching voltage regulator, a step down switching voltage regulator, an invertor voltage regulator, a Zener controlled transistor series voltage regulator, a charge pump regulator, and an emitter follower voltage regulator. The voltage regulator 35A.B may further include a voltage multiplier, which is as an electronic circuit or device that delivers an output voltage having an amplitude (peak value) that is two, three, or more times greater than the amplitude (peak value) of the input voltage. The voltage regulator 35A,B is in electrical connection with the rectifier 33A,B and configured to adjust the amplitude of the electrical voltage of the wirelessly received electrical energy signal, after conversion to AC by the rectifier 33A.B. In some examples, the voltage regulator 35A,B may an LDO linear voltage regulator; however, other voltage regulation circuits and/or systems are contemplated.

As illustrated, the direct current electrical energy signal output by the voltage regulator 35A,B is received at the load 16A,B of the electronic device 14A,B. In some examples, a portion of the direct current electrical power signal may be utilized to power the receiver control system 36A,B and any components thereof; however, it is certainly possible that the receiver control system 36A,B, and any components thereof, may be powered and/or receive signals from the load 16A,B (e.g., when the load 16A,B is a battery and/or other power source) and/or other components of the electronic device 14A,B.

The receiver control system 36A,B may include, but is not limited to including, a receiver controller 38A,B, a communications system 39A,B and a memory 37A.B. The receiver controller 38A,B may be any electronic controller or computing system that includes, at least, a processor which performs operations, executes control algorithms, stores data, retrieves data, gathers data, controls and/or provides communication with other components and/or subsystems associated with the wireless receiver system 30A,B. The receiver controller 38A,B may be a single controller or may include more than one controller disposed to control various functions and/or features of the wireless receiver system 30A.B. Functionality of the receiver controller 38A,B may be implemented in hardware and/or software and may rely on one or more data maps relating to the operation of the wireless receiver system 30A,B. To that end, the receiver controller 38A,B may be operatively associated with the memory 37A.B. The memory may include one or both of internal memory, external memory, and/or remote memory (e.g., a database and/or server operatively connected to the receiver controller 38A,B via a network, such as, but not limited to, the Internet). The internal memory and/or external memory may include, but are not limited to including, one or more of a read only memory (ROM), including programmable read-only memory (PROM), erasable programmable read-only memory (EPROM or sometimes but rarely labelled EROM), electrically erasable programmable read-only memory (EEPROM), random access memory (RAM), including dynamic RAM (DRAM), static RAM (SRAM), synchronous dynamic RAM (SDRAM), single data rate synchronous dynamic RAM (SDR SDRAM), double data rate synchronous dynamic RAM (DDR SDRAM, DDR2, DDR3, DDR4), and graphics double data rate synchronous dynamic RAM (GDDR SDRAM, GDDR2, GDDR3, GDDR4, GDDR5), a flash memory, a portable memory, and the like. Such memory media are examples of nontransitory computer readable memory media.

Further, while particular elements of the receiver control system 36A,B are illustrated as subcomponents and/or circuits (e.g., the memory 37A,B, the communications system 39A,B, among other contemplated elements) of the receiver control system 36A,B, such components may be external of the receiver controller 38. In some examples, the receiver controller 38A,B may be and/or include one or more integrated circuits configured to include functional elements of one or both of the receiver controller 38A,B and the wireless receiver system 30A,B, generally. As used herein, the term "integrated circuits" generally refers to a circuit in which all or some of the circuit elements are inseparably associated and electrically interconnected so that it is considered to be indivisible for the purposes of construction and commerce. Such integrated circuits may include, but are not limited to including, thin-film transistors, thick-film technologies, and/or hybrid integrated circuits.

In some examples, the receiver controller 38A,B may be a dedicated circuit configured to send and receive data at a given operating frequency. For example, the receiver controller 38A,B may be a tagging or identifier integrated circuit, such as, but not limited to, an NFC tag and/or labelling integrated circuit. Examples of such NFC tags and/or labelling integrated circuits include the NTAG® family of integrated circuits manufactured by NXP Semiconductors N.V. However, the communications system 39A,B is certainly not limited to these example components and, in some examples, the communications system 39A,B may be implemented with another integrated circuit (e.g., integrated with the receiver controller 38A,B), and/or may be another transceiver of or operatively associated with one or both of the electronic device 14A,B and the wireless receiver system 30A,B, among other contemplated communication systems and/or apparatus. Further, in some examples, functions of the communications system 39A,B may be integrated with the receiver controller 38A,B, such that the controller modifies the inductive field between the antennas 21A,B, 31A,B to communicate in the frequency band of wireless power transfer operating frequency.

Figure 11:
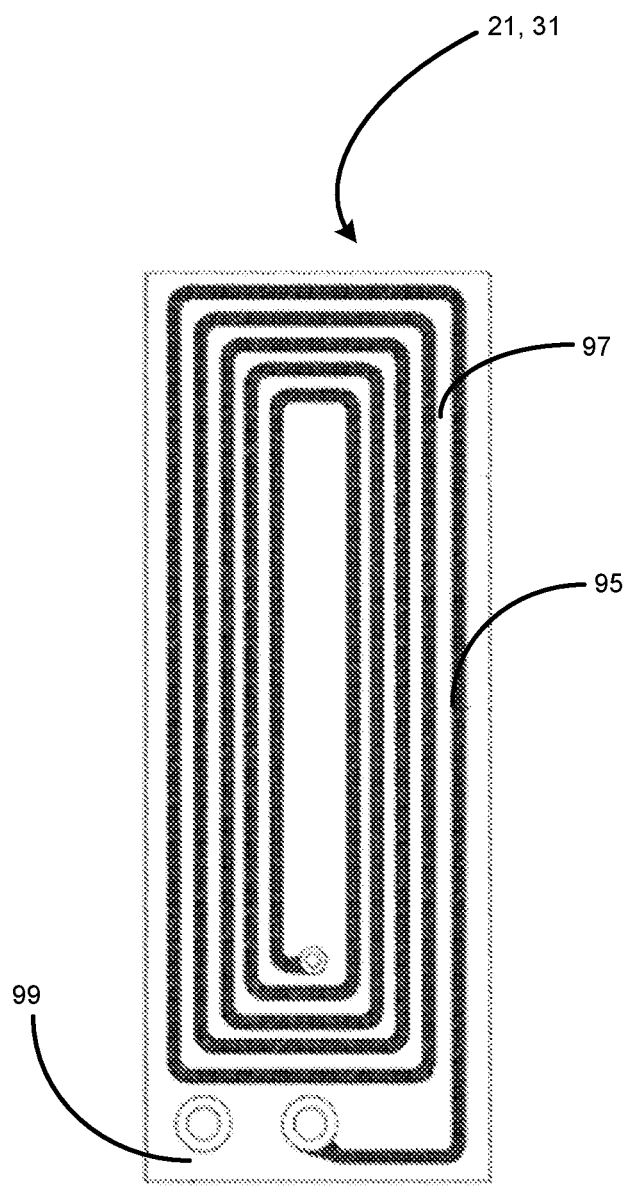
FIG. 11 is a top view of a non-limiting, exemplary antenna, for use as one or both of a transmission antenna and a receiver antenna in accordance with the present disclosure.

FIG. 11 illustrates an example, non-limiting embodiment of the receiver antenna 31A,B that may be used with any of the systems, methods, and/or apparatus disclosed herein. In the illustrated embodiment, the antenna 31A,B, is a flat spiral coil configuration. Non-limiting examples can be found in U.S. Pat. Nos. 9,941,743, 9,960,628, 9,941,743 all to Peralta et al.; 9,948,129, 10,063,100 to Singh et al.; 9,941590 to Luzinski; U.S. Pat. No. 9,960,629 to Rajagopalan et al.; and U.S. Patent App. Nos. 2017/0040107, 2017/0040105, 2017/0040688 to Peralta et al.; all of which are assigned to the assignee of the present application and incorporated fully herein by reference.

In addition, the antenna 31A,B may be constructed having a multi-layer-multi-turn (MLMT) construction in which at least one insulator is positioned between a plurality of conductors. Non-limiting examples of antennas having an MLMT construction that may be incorporated within the wireless transmission system(s) 20A,B and/or the wireless receiver system(s) 30A,B may be found in U.S. Pat. Nos. 8,610,530, 8,653,927, 8,680,960, 8,692,641, 8,692,642, 8,698,590, 8,698,591, 8,707,546, 8,710,948, 8,803,649, 8,823,481, 8,823,482, 8,855,786, 8,898,885, 9,208,942, 9,232,893, and 9,300,046 to Singh et al., all of which are assigned to the assignee of the present application are incorporated fully herein. These are merely exemplary antenna examples; however, it is contemplated that the antennas 21A,B, 31A,B may be any antenna capable of the aforementioned higher power, high frequency wireless power transfer.

As noted above, the use of a single input power source for multiple transmitter systems and their associated receiver systems can lead to degraded performance when one receiver system is removed from its transmitter system. For example, in dual charger systems, cross talk and/or cross coupling may occur.

Cross coupling may occur when one transmitter remains in power transfer mode when there is no receiver associated with that transmitter while there is still a receiver associated with the other transmitter. The system may work properly when there is only one receiver system charging initially or when both receiver systems are charging at the same time. However, cross coupling can occur when there are two receiver systems charging and then one receiver system is removed from its transmitter system. In this case, the transmitter system that is to be idled may remain in power transfer mode if it detects that it is receiving packets. "Packets," as referenced herein, refer to any power and/or data signal(s) transferred from a transmission system 20 to a receiver system 30. That is, due to the proximity of the two transmitter systems to one another, the now-unused transmitter system may mistakenly accept packets sent from the other receiver system intended for the other transmitter system.

This cross talk can cause a number of problems in the system. First, the user experience may be degraded because the charging light or other charging indicator on the unused transmitter system may remain lit even though there is no associated receiver system present. Secondly, as the unused transmitter remains in power transfer mode without an associated receiver system, overall charging efficiency decreases and system thermal issues may arise.

Figure 12:
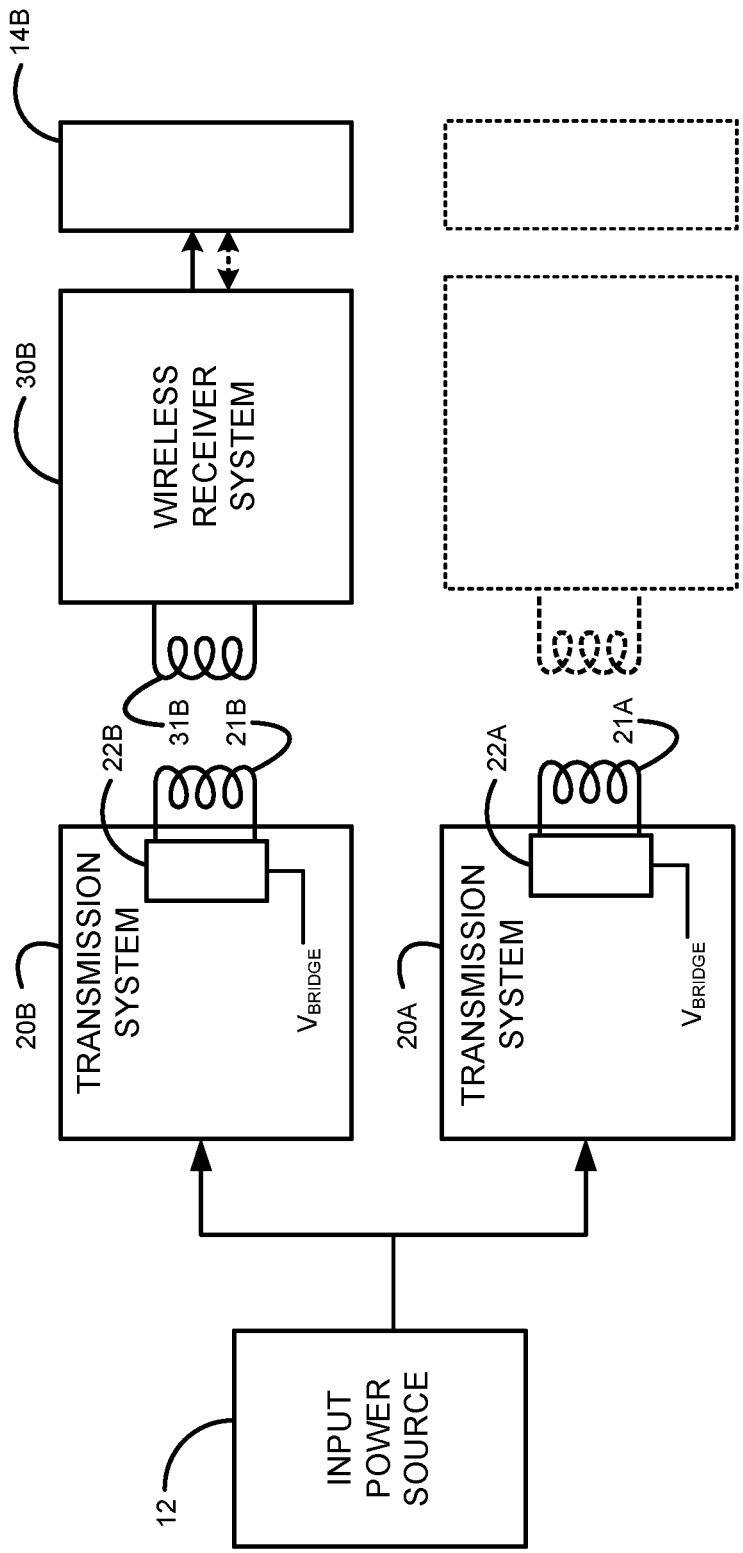
FIG. 12 is a block diagram of an embodiment of a system for wirelessly transferring one or more of electrical energy, electrical power signals, electrical power, electromagnetic energy, electronic data, and combinations thereof, in accordance with the present disclosure.

The primary cause of the observed cross talk is feedback into the input power system that powers both transmitter systems. This can be better understood by reference to FIG. 12, which shows the system architecture of FIG. 1, but with the with the second receiver system now removed and with certain relevant driving circuitry shown for clarity.

As will be recalled, the first transmitter system 20A and second transmitter system 20B share a single front end and i/p voltage source 12. Shown in greater detail in this figure are the H-bridge circuits 22A,22B used to power respective antennas 21A, 21B. Each H-bridge circuit 22A,22B is powered, by the common source 12, at a voltage $V_{bridge}$. Any noise appearing on $V_{in}$ will often appear on the $V_{Bridge}$ signals that drive the antennas 21A, 21B. As a result, this noise can then appear on the coil (antenna) voltage as well, as if it were a signal from a receiver antenna.

Figure 13:
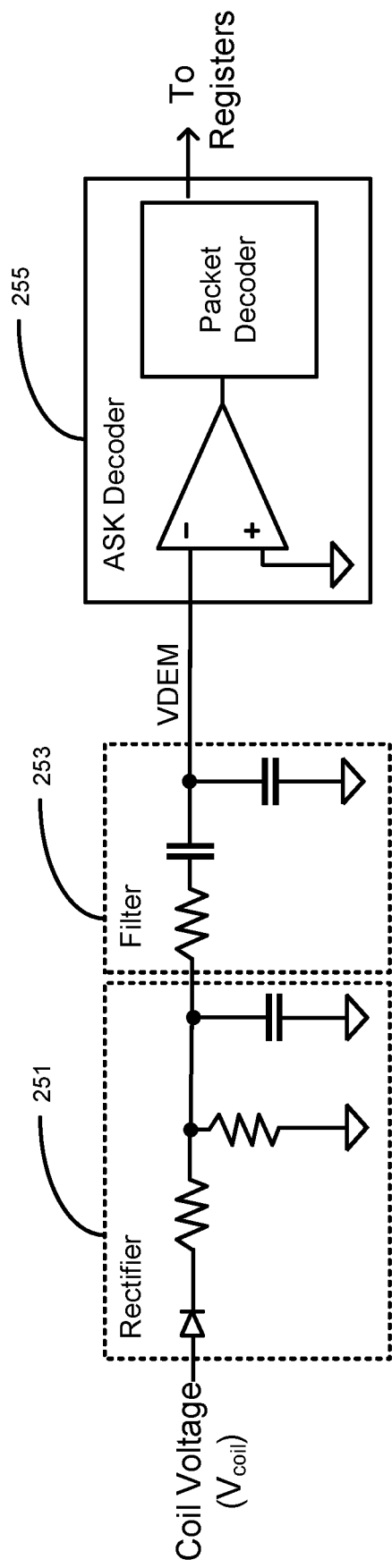
FIG. 13 is a schematic diagram of a demodulation circuit usable in accordance with the present disclosure.

In the illustrated configuration, this has the effect of creating a "ghost" signal on antenna 21A, even though the respective receiver system is no longer present. This ghost signal appearing in the coil voltage may be processed as follows to yield received packets that were actually sent by receiver system 30B for transmission system 20B. In systems such as Qi and Qi like systems, a receiver sends data and packets to its associated transmitter using ASK (Amplitude shift keying). Those packets are demodulated on the transmitter side using voltage demodulation, such as via the example demodulation circuit shown schematically in FIG. 13. As shown, the sensed coil voltage is demodulated by rectification (via rectifier 251) and filtering (via filter 253). The demodulated signal $V_{DEM}$ is then input to an ASK Decoder 255 for the decoding of packets.

Supply voltage disturbances that are reflected in the coil voltage via $V_{Bridge}$ thus have the potential to persist through rectification and filtering, to be recognized as packets rather than noise, hence the ghost packets. This is especially true when the supply voltage disturbances are the result of crosstalk with a coil (antenna 21B) that is actually receiving packets (from antenna 31B) that are specifically designed to survive and indeed be emphasized by demodulation.

In short, depending upon magnitude, noise in the voltage supply can affect the demodulation of the packets at the ostensibly idled transmitter. In the illustrated environment of FIG. 12, this means that when two receivers are charging, and one is then removed, the noise/load on the voltage line remains unchanged. This can result in the noise/load being perceived by the idled transmitter as received packets and not as noise. This state may persist despite the fact that there is no longer a receiver present on or associated with the affected transmitter.

Figure 14:
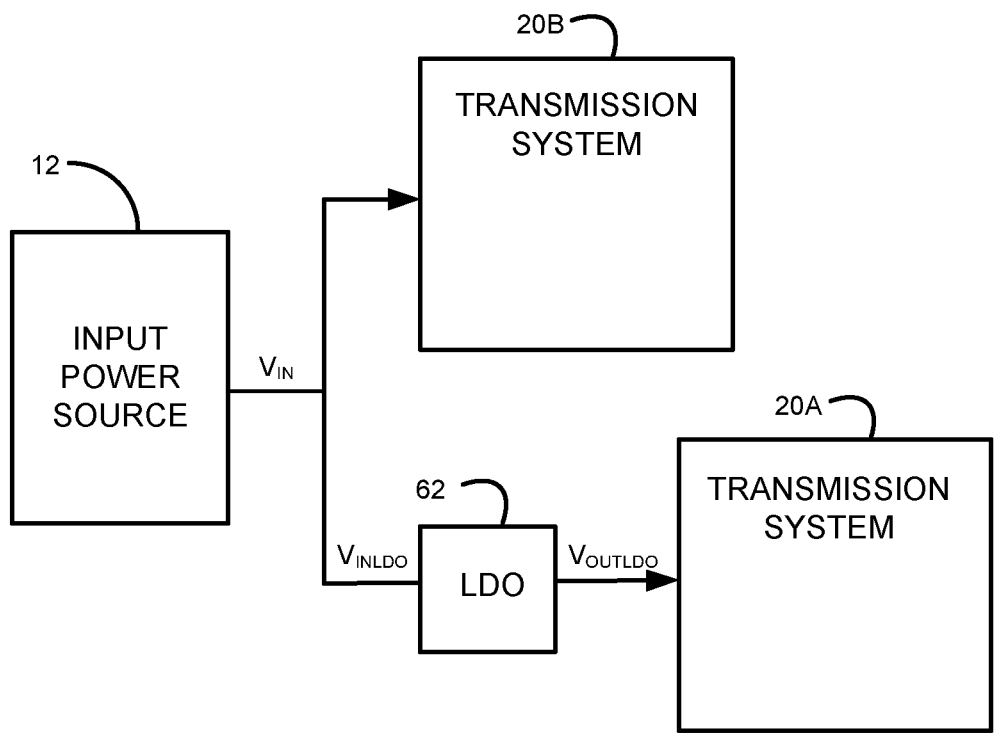
FIG. 14 is a schematic diagram of a circuit for alleviating data feedback between transmitter antennas in accordance with the present disclosure.

In an embodiment, in order to alleviate data feedback between antennas through the power supply to coil drivers, one of the transmitter system power inputs is selectively isolated via a low voltage drop out (LDO). This feature is shown in simplified schematic form in FIG. 14. As shown, the LDO 62 isolates the power supply for the first transmitter system 20A from the power supply for the second transmitter system 20B while still allowing the use of a single power source 12.

In an embodiment, the LDO output voltage ($V_{outldo}$) is set to 4.6V in order to ensure it does not bypass LDO; that is, with $V_{outldo}$ set to 4.6V, the level of $V_{inldo}$ ($V_{in}$) will always be higher than $V_{ourldo}$. This value is based on the observation that $V_{in}$ will drop to about 4.7V in full load condition when two devices will be charging simultaneously. It will be appreciated that the LDO $V_{outldo}$ may be set to any other appropriate value that meets the foregoing requirement of remaining lower than $V_{inldo}$ ($V_{in}$) under load.

In an embodiment, another LDO is placed at the power input of the remaining transmitter to nullify the return path of noise from the first transmitter through the common ground. However, in yet another embodiment, only a single LDO is used, and software filtering is employed to reduce noise on the demodulated signal. This approach provides a low cost solution to alleviate cross talk while still allowing the use of a single common voltage adapter for the dual charger system.

The systems, methods, and apparatus disclosed herein are designed to operate in an efficient, stable and reliable manner to satisfy a variety of operating and environmental conditions. The systems, methods, and/or apparatus disclosed herein are designed to operate in a wide range of thermal and mechanical stress environments so that data and/or electrical energy is transmitted efficiently and with minimal loss. In addition, the system 10 may be designed with a small form factor using a fabrication technology that allows for scalability, and at a cost that is amenable to developers and adopters. In addition, the systems, methods, and apparatus disclosed herein may be designed to operate over a wide range of frequencies to meet the requirements of a wide range of applications.

In an embodiment, a ferrite shield may be incorporated within the antenna structure to improve antenna performance. Selection of the ferrite shield material may be dependent on the operating frequency as the complex magnetic permeability ($\mu=\mu'-j*\mu''$) is frequency dependent. The material may be a polymer, a sintered flexible ferrite sheet, a rigid shield, or a hybrid shield, wherein the hybrid shield comprises a rigid portion and a flexible portion. Additionally, the magnetic shield may be composed of varying material compositions. Examples of materials may include, but are not limited to, zinc comprising ferrite materials such as manganese-zinc, nickel-zinc, copper-zinc, magnesium-zinc, and combinations thereof.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more embodiments, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub combination or variation of a sub combination.

The invention claimed is:

1. A wireless transmission system comprising:
   an input power supply configured to provide power at a first voltage ($V_1$);
   a first wireless power transmission system configured to:
      receive first direct current (DC) input power at a first power input from the input power supply, the first DC input power received at a voltage substantially similar to $V_1$;
      transmit first wireless power signals based on the first power input; and
      receive wireless data signals, wherein the wireless data signals are encoded as variations in power of the first wireless power signals;
   a second wireless power transmission system configured to:
      receive second DC input power at a second power input from a low voltage drop out, the second DC input power having a second voltage ($V_2$) that is lower than $V_1$;
      transmit second wireless power signals; and
   the low voltage drop out configured to:
      receive the first DC input power from the input power supply; and
      generate the second DC input power, wherein the second DC input power is isolated from the variations in power of the first wireless power signals.

2. The wireless transmission system of claim 1:
   wherein the first wireless power transmission system comprises a first transmitter antenna and a first driver for driving the first transmitter antenna to transmit the first wireless power signals; and
   wherein the second wireless power transmission system comprises a second transmitter antenna and a second driver for driving the second transmitter antenna to transmit the second wireless power signals.

3. The wireless transmission system of claim 2, wherein the first driver comprises an H-bridge.

4. The wireless transmission system of claim 3, wherein the wireless data signals encoded as variations in power of the first wireless power signals are fed back onto the first power input by a power input of the H-bridge.

5. The wireless transmission system of claim 2:
   wherein the first wireless power transmission system further comprises a first transmission controller configured to provide first driving signals to the first antenna driver; and
   wherein the second wireless power transmission system further comprises a second transmission controller configured to provide second driving signals to the second antenna driver.

6. The wireless transmission system of claim 2, wherein at least one of the first transmission antenna and the second transmission antenna are configured to operate based on an operating frequency of about 88-360 kilohertz (kHz).

7. The wireless transmission system of claim 1, wherein, during receipt of the wireless data signals, $V_1$ varies over a range having a lowest value, and wherein $V_2$ is preselected to remain below the lowest value of the range of $V_1$.

8. The wireless transmission system of claim 1:
wherein the first wireless power transmission system transmits the first wireless power signals to a first wireless receiver system; and
wherein the second wireless power transmission system transmits the second wireless power signals to a second wireless receiver system.

9. The wireless transmission system of claim 8, wherein one or both of the first and second wireless receiver systems includes a powered load.

10. The wireless transmission system of claim 9, wherein the powered load is an electrical energy storage device.

11. The wireless transmission system of claim 8:
wherein the first wireless power transmission system receiving the wireless data signals comprises the first wireless power transmission system receiving the wireless data signals from the first wireless receiver system; and
wherein the first wireless power transmission system comprises a demodulation circuit configured to process and demodulate the wireless data signals received from the first wireless receiver system.

12. The wireless transmission system of claim 1, wherein the wireless data signals received by the first wireless power transmission system are encoded as variations in power of the first wireless power signals via amplitude shift keying (ASK).

13. A method for operating a wireless transmission system, the method comprising:
receiving, at a first wireless power transmission system, first DC input power at a first power input from an input power supply that is configured to provide power at a first voltage ($V_1$), the first DC input power received via the first wireless power transmission system at a voltage substantially similar to $V_1$;
transmitting, via the first wireless power transmission system, first wireless power signals based on the first power input;
receiving, at the first wireless power transmission system, wireless data signals, wherein the wireless data signals are encoded as variations in power of the first wireless power signals;
receiving, at a low voltage drop out, the first DC input power from the input power supply;
generating, using the low voltage drop out, a second DC input power having a second voltage ($V_2$) that is lower than $V_1$, wherein the second DC input power is isolated from the variations in power of the first wireless power signals; and
receiving, at a second wireless power transmission system, the second DC input power from the low voltage drop out.

14. The method of claim 13:
wherein transmitting, via the first wireless power transmission system, the first wireless power signals comprises driving a first transmitter antenna of the first wireless power transmission system via a first driver of the first wireless power transmission system; and
wherein transmitting, via the second wireless power transmission system, the second wireless power signals comprises driving a second transmitter antenna of the second wireless power transmission system via a second driver of the second wireless power transmission system.

15. The method of claim 14, wherein the first driver comprises an H-Bridge, and wherein the wireless data signals encoded as variations in power of the first wireless power signals are fed back onto the first power input by a power input of the H-Bridge.

16. The method of claim 13, wherein, during receipt of the wireless data signals, $V_1$ varies over a range having a lowest value, and wherein $V_2$ is preselected to remain below the lowest value of the range of $V_1$.

17. The method of claim 13:
wherein transmitting, via the first wireless power transmission system, the first wireless power signals comprises transmitting the first wireless power signals to a first wireless power receiver system; and
wherein transmitting, via the second wireless power transmission system, the second wireless power signals comprises transmitting the second wireless power signals to a second wireless power receiver system.

18. The method of claim 17, wherein one or both of the first and second wireless receiver systems includes a powered load comprising an electrical energy storage device.

19. The method of claim 17:
wherein receiving, at the first wireless power transmission system, the wireless data signals comprises receiving, via the first wireless power transmission system, the wireless data signals from the first wireless receiver system; and
wherein the first wireless power transmission system comprises a demodulation circuit configured to process and demodulate the wireless data signals received from the first wireless receiver system.

20. The method of claim 13, wherein the wireless data signals received by the first wireless power transmission system are encoded as variations in power of the first wireless power signals via amplitude shift keying (ASK).

* * * * *